United States Patent
Hwang et al.

(10) Patent No.: US 11,071,968 B2
(45) Date of Patent: Jul. 27, 2021

(54) METHOD FOR PREPARING SUPERABSORBENT POLYMER AND SUPERABSORBENT POLYMER PREPARED THEREBY

(71) Applicant: LG Chem, Ltd., Seoul (KR)

(72) Inventors: Min Ho Hwang, Daejeon (KR); Hye Mi Nam, Daejeon (KR); Sang Gi Lee, Daejeon (KR); Soo Jin Lee, Daejeon (KR); Tae Hwan Jang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/809,057

(22) Filed: Mar. 4, 2020

(65) Prior Publication Data

US 2020/0197909 A1   Jun. 25, 2020

Related U.S. Application Data

(62) Division of application No. 15/576,127, filed as application No. PCT/KR2016/007512 on Jul. 11, 2016, now Pat. No. 10,632,451.

(30) Foreign Application Priority Data

Mar. 24, 2016  (KR) .................. 10-2016-0035409
Jul. 8, 2016   (KR) .................. 10-2016-0086939

(51) Int. Cl.
*B01J 20/26*  (2006.01)
*C08J 3/24*   (2006.01)
(Continued)

(52) U.S. Cl.
CPC ............. *B01J 20/267* (2013.01); *B01J 20/08* (2013.01); *B01J 20/103* (2013.01); *B01J 20/28007* (2013.01); *B01J 20/28059* (2013.01); *B01J 20/28061* (2013.01); *B01J 20/3021* (2013.01); *B01J 20/3085* (2013.01); *C08F 220/06* (2013.01); *C08J 3/075* (2013.01);
(Continued)

(58) Field of Classification Search
None
See application file for complete search history.

(56) References Cited

U.S. PATENT DOCUMENTS 5,032,628 A   7/1991   Choi et al.
5,690,624 A   11/1997  Sasaki et al.
(Continued)

FOREIGN PATENT DOCUMENTS

JP   H0810616 A       1/1996
JP   2005097604 A     4/2005
(Continued)

OTHER PUBLICATIONS

Evonik Industries: Degussa goes East, Nov. 1, 2018, Retrieved from the Internet: URL:https://corporate.evonik.com/en/pages/article.aspx?articleId=1104, XP055525624.
(Continued)

*Primary Examiner* — Katie L. Hammer
(74) *Attorney, Agent, or Firm* — Lerner, David, Littenberg, Krumholz & Mentlik, LLP

(57) ABSTRACT

The present invention relates to a method for preparing superabsorbent polymer that has not only excellent permeability and absorption speed, but also minimized absorbency under pressure decrease rate, and superabsorbent polymer prepared thereby.

12 Claims, 3 Drawing Sheets

(51) Int. Cl.
  *C08J 3/12* (2006.01)
  *C08K 3/22* (2006.01)
  *C08F 220/06* (2006.01)
  *C08J 3/075* (2006.01)
  *C08K 3/36* (2006.01)
  *B01J 20/08* (2006.01)
  *B01J 20/10* (2006.01)
  *B01J 20/28* (2006.01)
  *B01J 20/30* (2006.01)

(52) U.S. Cl.
  CPC . *C08J 3/12* (2013.01); *C08J 3/24* (2013.01); *C08J 3/245* (2013.01); *C08K 3/22* (2013.01); *C08K 3/36* (2013.01); *B01J 2220/68* (2013.01); *C08J 2333/02* (2013.01); *C08K 2003/2227* (2013.01)

(56) References Cited

U.S. PATENT DOCUMENTS

| | | |
|---|---|---|
| 8,420,567 B1 | 4/2013 | Naumann et al. |
| 2005/0113252 A1 | 5/2005 | Miyake et al. |
| 2005/0250866 A1 | 11/2005 | Champ et al. |
| 2008/0200891 A1 | 8/2008 | Kim et al. |
| 2008/0234645 A1 | 9/2008 | Dodge et al. |
| 2008/0306209 A1 | 12/2008 | Stueven et al. |
| 2009/0298685 A1 | 12/2009 | Torii et al. |
| 2013/0130895 A1 | 5/2013 | Herfert et al. |
| 2013/0260988 A1 | 10/2013 | Herfert et al. |
| 2015/0093575 A1 | 4/2015 | Naumann et al. |
| 2016/0235882 A1 | 8/2016 | Noh et al. |
| 2017/0014801 A1 | 1/2017 | Ikeuchi et al. |
| 2017/0073478 A1 | 3/2017 | Joo et al. |

FOREIGN PATENT DOCUMENTS

| | | |
|---|---|---|
| JP | 2009531158 A | 9/2009 |
| JP | 2010522008 A | 7/2010 |
| KR | 910008293 B1 | 10/1991 |
| KR | 20090123904 A | 12/2009 |
| KR | 20140102264 A | 8/2014 |
| KR | 20140107491 A | 9/2014 |
| KR | 20160016714 A | 2/2016 |
| WO | 2004096304 A1 | 11/2004 |
| WO | 2015088266 A1 | 6/2015 |
| WO | 2015129917 A1 | 9/2015 |

OTHER PUBLICATIONS

Evonik Industries: "Product information 1-15 Aeroxide Alu C", B01J, Jan. 22, 2018, Retrieved from the Internet: URL:https://products-re.evomk.com/www2/uploads/producfinder/AEROXIDE-Alu-C-EN.pdf, XP055524258.
Extended European Search Report including Written Opinion for Application No. EP16895588.8 dated Nov. 29, 2018.
Odian, George, "Principles of Polymerization." Second Edition, John Wiley & Sons, Inc., Copyright 1981, p. 203.
Schwalm, Reinhold, "UV Coatings: Basics, Recent Developments and New Applications." Elsevier Science, Dec. 21, 2006, p. 115.
Search Report from International Application No. PCT/KR2016/007512, dated Feb. 6, 2017.

[FIG. 1]
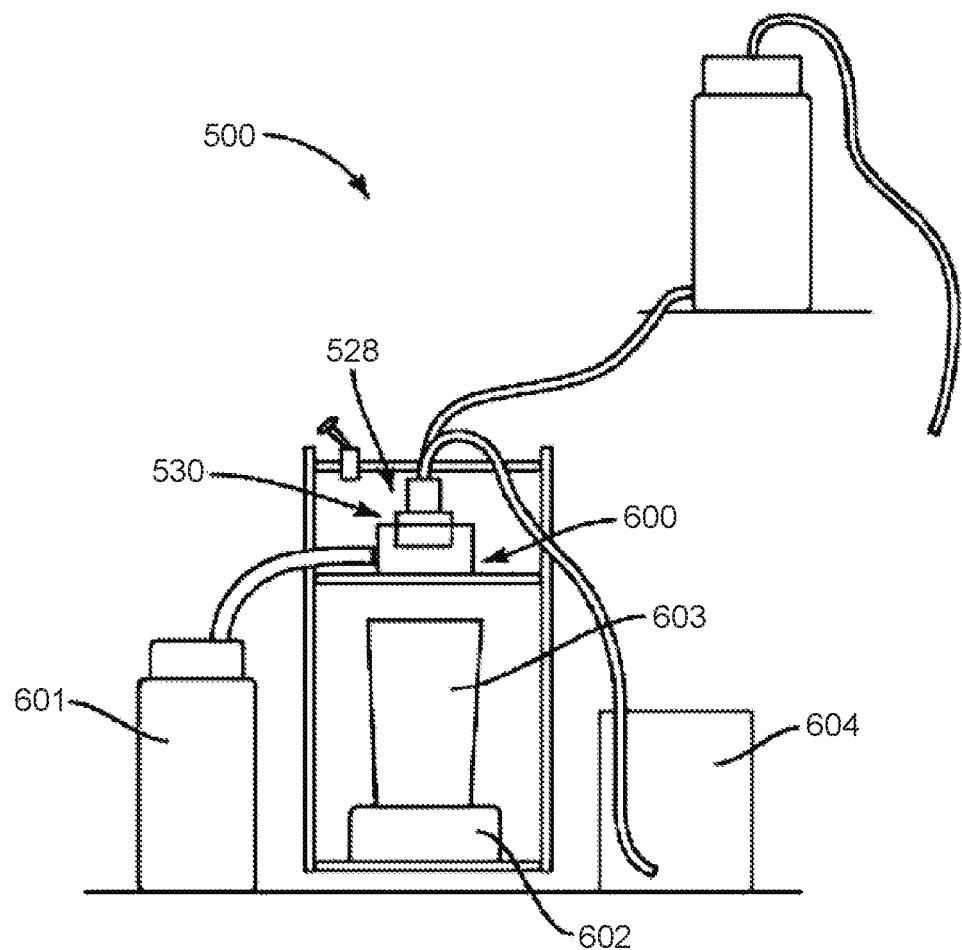

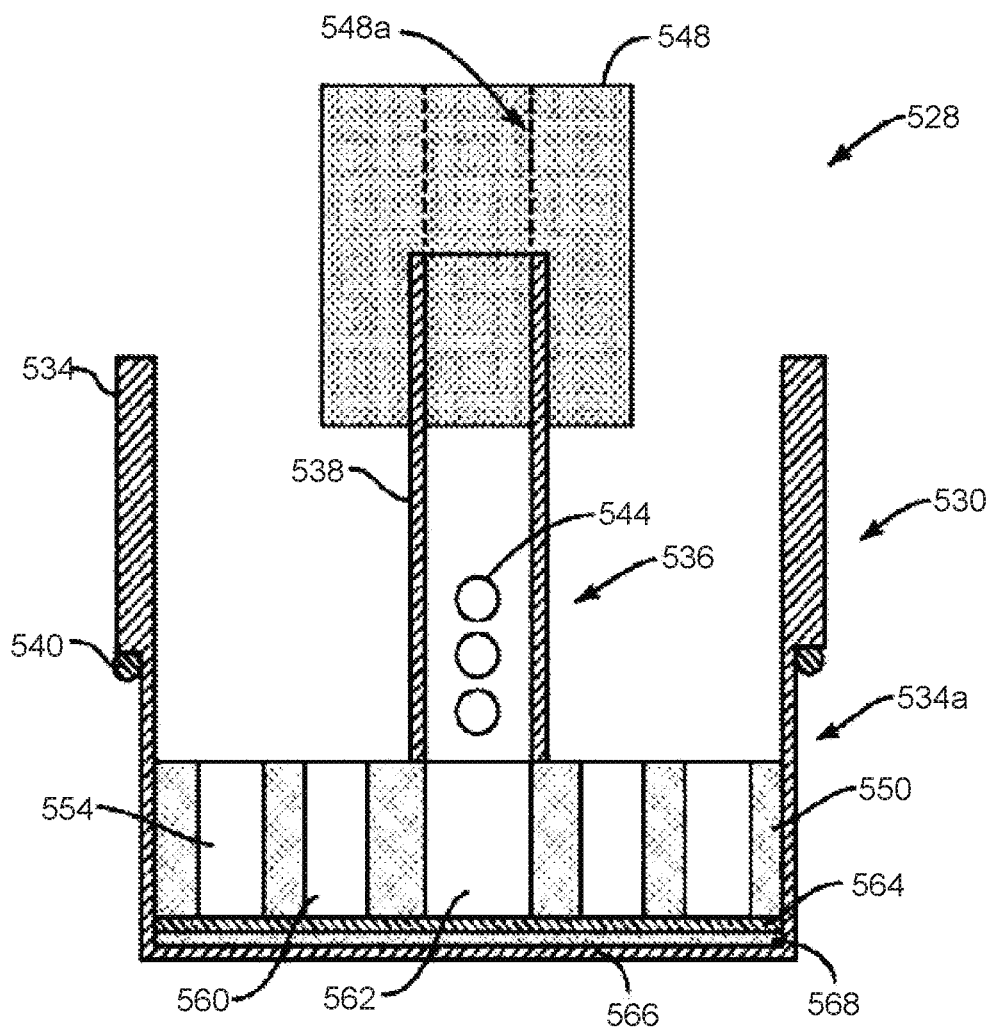
[FIG. 2]

[FIG. 3]
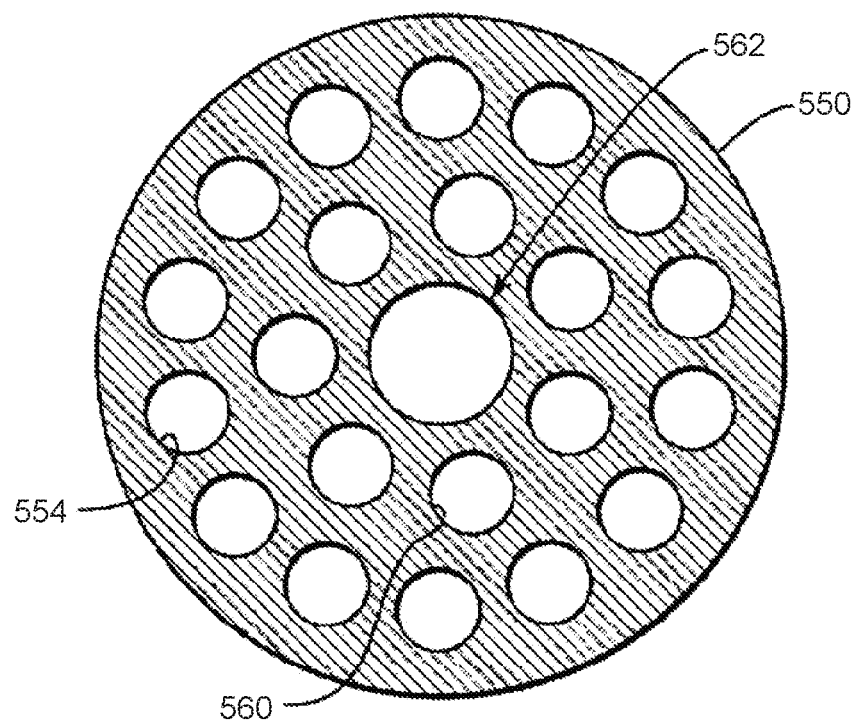

METHOD FOR PREPARING SUPERABSORBENT POLYMER AND SUPERABSORBENT POLYMER PREPARED THEREBY

CROSS-REFERENCE TO RELATED APPLICATION(S)

The present application is a Divisional of U.S. patent application Ser. No. 15/576,127, filed Nov. 21, 2017, which is a National Phase entry under 35 U.S.C. § 371 of International Application No. PCT/KR2016/007512, filed Jul. 11, 2016, which claims the benefit of Korean Patent Application No. 10-2016-0035409, filed on Mar. 24, 2016, and Korean Patent Application No. 10-2016-0086939, filed on Jul. 8, 2016, the disclosures of which are incorporated by reference herein.

TECHNICAL FIELD

The present invention relates to a method for preparing superabsorbent polymer that not only has excellent permeability and absorption speed, but also has minimized decrease rate of absorbency under load, and superabsorbent polymer prepared thereby.

BACKGROUND ART

Superabsorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as a disposable diaper and so on, water-holding material for soil, water stop material for civil engineering and architecture, sheets for raising seedling, freshness preservatives in the field of food circulation, and so on.

In most cases, such superabsorbent polymer is widely used in the field of hygienic products such as a diaper or a sanitary pad, etc., and for this purpose, it is required to exhibit a fast absorption speed for moisture, etc., and to exhibit absorption speed above a certain level even under external pressure.

Particularly, with the thinning of hygienic products such as a diaper or a sanitary pad, etc., higher absorption performance is required for superabsorbent polymer. Above all, it is an important problem on the rise to improve permeability and absorption speed together, the conflicting properties of superabsorbent polymer, so that body liquid may be rapidly spread in the hygienic product, and simultaneously, may be absorbed fast.

Thus, there is an attempt to improve permeability of superabsorbent polymer by allowing inorganic particles such as silica, etc. to exist between superabsorbent polymer particles so as to improve permeability and absorption speed of superabsorbent polymer together.

However, in case large quantities of inorganic particles are used for sufficient improvement in permeability of superabsorbent polymer, the absorption speed was rather lowered under pressure. And, the inorganic particles added to the superabsorbent polymer in the processes of grinding and sieving of superabsorbent polymer were separated, and thus, it was difficult to expect improvement in permeability to a desired level.

Therefore, there is an urgent demand for the studies on the improvement in permeability and absorption speed of superabsorbent polymer without causing the above described problems.

DETAILED DESCRIPTION OF THE INVENTION

Technical Problem

It is an object of the present invention to provide a method for preparing a superabsorbent polymer that has not only excellent permeability and absorption speed, but also minimized absorbency under pressure decrease rate.

It is another object of the present invention to provide a superabsorbent polymer prepared by the method for preparing superabsorbent polymer.

Technical Solution

A method for preparing superabsorbent polymer comprising the steps of: conducting crosslinking polymerization of a monomer mixture comprising a water soluble ethylenically unsaturated monomer having an acid group at least of which is neutralized, in the presence of an internal crosslinking agent, to form a hydrogel polymer; drying, grinding and sieving the hydrogel polymer to form a base resin powder; mixing the base resin powder with a surface crosslinking solution comprising a first inorganic material and a surface crosslinking agent to form a surface crosslinked layer and adding a second inorganic material to the base resin powder on which the surface crosslinked layer is formed, wherein the second inorganic material comprises alumina having a BET specific surface area of 50 $m^2/g$ to 200 $m^2/g$, is provided herein.

And, a superabsorbent polymer comprising a base resin powder comprising a crosslinked polymer of a water soluble ethylenically unsaturated monomer having an acid group of which at least a part is neutralized; a surface crosslinked layer formed on the base resin powder, comprising a first inorganic material; and a second inorganic material formed on the surface of the surface crosslinked layer, wherein the second inorganic material comprises alumina having a BET specific surface area of 50 $m^2/g$ to 200 $m^2/g$, is also provided herein.

And, a superabsorbent polymer comprising: a base resin powder comprising a crosslinked polymer of a water soluble ethylenically unsaturated monomer having an acid group of which at least a part is neutralized; a surface crosslinked layer formed on the base resin powder, comprising a first inorganic material; and a second inorganic material formed on the surface of the surface crosslinked layer, wherein the anti-caking efficiency according to the following Equation 5 is 85% to 100%:

$$\text{Anti-caking efficiency (\%)} = [W_6(g)/W_5(g)]*100 \quad \text{[Equation 5]}$$

in the Equation 5, $W_5$ (g) is the initial weight of superabsorbent polymer (g), and $W_6$ (g) is the amount (g) of superabsorbent polymer dropped when the superabsorbent polymer is coated on a flask dish of 9 cm diameter, maintained in a constant temperature and humidity chamber of temperature of 40±3° C. and humidity of 80±3% for 10 minutes, and cooled at room temperature for 5 minutes, and then, the flask dish is turned upside down on a filter paper, is also provided herein.

Hereinafter, a method for preparing superabsorbent polymer and superabsorbent polymer prepared thereby according to specific embodiments of the invention will be explained in detail.

According to one embodiment of the invention, a method for preparing superabsorbent polymer comprising the steps of: conducting crosslinking polymerization of a monomer mixture comprising a water soluble ethylenically unsaturated monomer having an acid group at least of which is neutralized, in the presence of an internal crosslinking agent, to form a hydrogel polymer; drying, grinding and sieving the hydrogel polymer to form a base resin powder; mixing the base resin powder with a surface crosslinking solution comprising a first inorganic material and a surface crosslinking agent to form a surface crosslinked layer and adding a second inorganic material to the base resin powder on which the surface crosslinked layer is formed, wherein the second inorganic material comprises alumina having a BET specific surface area of 50 $m^2/g$ to 200 $m^2/g$, is provided.

The present inventors confirmed through experiments that using the above-explained preparation method of superabsorbent polymer, agglomeration can be improved in the processes of storage and transfer while exhibiting equivalent or superior permeability and hygroscopicity compared to the previous methods, and absorbency under load can be maintained while maintaining permeability, and completed the present invention.

Specifically, in the method for preparing superabsorbent polymer of one embodiment, specific inorganic material, specifically silica or alumina is dispersed in the surface crosslinking solution used when conducting surface crosslinking, thus simultaneously progressing surface crosslinking and dispersion of inorganic particles. Thereby, agglomeration of inorganic particles can be minimized in the surface crosslinked layer prepared, thus distributing in the surface crosslinked layer while being uniformly dispersed.

As such, by dispersing specific inorganic particles in the surface crosslinking solution used when conducting surface crosslinking of superabsorbent polymer, and then, introducing the inorganic particles on the surface simultaneously with surface crosslinking, a dispersion degree can be improved compared to the case wherein inorganic particles are simply added and dispersed on the surface of surface crosslinked superabsorbent polymer, and the degree of loss of inorganic particles due to the failure to bind to the superabsorbent polymer can be lowered, and thus, even if a small amount of inorganic material is introduced, the residual amount of inorganic particles in the final superabsorbent polymer can be increased. Thus, inorganic material can be prevented from leaving in the processes of packaging, storage and transfer, thus stably realizing the effect of preventing decrease in absorbency under load.

In addition, in the method for preparing superabsorbent polymer of one embodiment, by further adding inorganic material to the base resin powder on which a surface crosslinked layer including inorganic particles is formed, agglomeration between base resin powder can be prevented while improving solution permeability.

That is, by using the preparation method of superabsorbent polymer of one embodiment, decrease in absorbency under load of prepared superabsorbent polymer can be minimized, and anti-caking efficiency can be improved, thus reducing agglomeration of superabsorbent polymer in the processes of storage and transfer after packaging. Simultaneously, it was confirmed that various properties of superabsorbent polymer such as centrifuge retention capacity, absorption speed, etc. are equivalent to the previous method of adding silica particles.

Hereinafter, a method for preparing superabsorbent polymer according to one embodiment will be explained in detail.

The method for preparing superabsorbent polymer according to one embodiment may comprise the step of conducting crosslinking polymerization of a monomer mixture comprising water soluble ethylenically unsaturated monomers having acid groups at least of which are neutralized, in the presence of an internal crosslinking agent, to form hydrogel polymer.

As the water soluble ethylenically unsaturated monomers, one or more kinds selected from the group consisting of anionic monomers and salts thereof such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid or 2-(meth)acrylamide-2-methyl propane sulfonic acid; non-ionic hydrophilic group containing monomers such as (meth)acrylamide, N-substituted (meth)acrylate, 2-hydroxyethyl (meth)acrylate, 2-hydroxypropyl (meth)acrylate, methoxy polyethylene glycol (meth)acrylate, or polyethylene glycol (meth)acrylate; and amino group containing unsaturated monomers such as (N,N)-dimethylaminoethyl (meth)acrylate, (N,N)-dimethylaminopropyl (meth)acrylamide, and quarternarized products thereof, may be used. Among them, acrylic acid or salts thereof, for example, acrylic acid and/or alkali metal salts such as a sodium salt thereof, in which at least a part of the acrylic acid is neutralized, may be used, and by using such monomers, superabsorbent polymer having more excellent properties can be prepared. In case the alkali metal salt of acrylic acid is used as monomers, the acrylic acid may be neutralized with a basic compound such as caustic soda (NaOH) before use. Here, the degree of neutralization of the water soluble ethylenically unsaturated monomers may be controlled to about 50% to 95% or about 70% to 85%, within which superabsorbent polymer having excellent centrifuge retention capacity can be provided without concern for precipitation during neutralization.

In the monomer mixture comprising water soluble ethylenically unsaturated monomers, the concentration of the water soluble ethylenically unsaturated monomers may be controlled to about 20 wt % to about 60 wt %, or about 40 wt % to about 50 wt %, based on the total monomer mixture comprising raw materials and solvent, and may be appropriately controlled considering polymerization time and reaction condition, etc. However, if the concentration of the monomers becomes too low, yield of superabsorbent polymer may decrease, thus causing economical problems, and if the concentration becomes too high, process problems may be generated such as precipitation of a part of the monomers or low grinding efficiency during grinding of polymerized hydrogel polymer, etc., and the properties of superabsorbent polymer may be deteriorated.

As the internal crosslinking agent for introducing a basic crosslinking structure into the base rein powder, any internal crosslinking agents having crosslinkable functional groups previously used for the preparation of superabsorbent polymer may be used without specific limitations. However, in order to introduce an appropriate crosslinked structure into the base resin powder to further improve the properties of superabsorbent polymer, multi-functional acrylate-based compounds having plural ethylene oxide groups may be used as the internal crosslinking agent. Specific examples of the internal crosslinking agent may include one or more selected from the group consisting of polyethylene glycol diacrylate (PEGDA), glycerin diacrylate, glycerin triacrylate, non-modified or ethoxylated trimethylol propane triacrylate (Ethoxylated-TMPTA), hexanediol diacrylate, and triethylene glycol diacrylate. The internal crosslinking agent may be included in the concentration of about 0.01 wt % to about 0.5 wt %, based on the monomer mixture, thus crosslinking the polymerized polymer.

And, the monomer mixture may further comprise a polymerization initiator commonly used for the preparation of superabsorbent polymer.

Specifically, as the polymerization initiators, a thermal polymerization initiator or a photopolymerization initiator according to UV irradiation, and so on, may be used according to polymerization methods. However, even in the case of photopolymerization, since a certain amount of heat is generated by UV irradiation, etc., and heat is generated to some degree according to the progression of an exothermic polymerization reaction, a thermal polymerization initiator may be additionally included. The photopolymerization initiator is not limited in terms of its construction, as long as it is a compound capable of forming a radical by light such as UV. As the photopolymerization initiator, for example, one or more compounds selected from the group consisting of benzoin ether, dialkyl acetophenone, hydroxyl alkylketone, phenyl glyoxylate, Benzyl Dimethyl Ketal, acyl phosphine, and α-aminoketone may be used. As the specific example of the acyl phosphine, commercially used lucirin TPO, namely, 2,4,6-trimethyl-benzoyl-trimethyl phosphine oxide, or IRGACURE 819, namely, bis(2,4,6-trimethylbenzoyl)-phenylphosphineoxide may be used.

More various photopolymerization initiators are described in Reinhold Schwalm, "UV Coatings: Basics, Recent Developments and New Application (Elsevier 2007)", page 115, and are not limited to the above described examples.

The photopolymerization initiator may be added in the concentration of about 0.01 to about 1.0 wt %, based on the monomer composition. If the concentration of the photopolymerization initiator is too low, polymerization speed may become slow, and if the concentration of the polymerization initiator is too high, the molecular weight of the superabsorbent polymer may be small and the properties may become nonuniform.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis [2-(2-imidazolin-2-yl) propane]dihydrochloride, 4,4-azobis-(4-cyanovalericacid), etc.

More various thermal initiators are described in "Principle of Polymerization (Wiley, 1981)", Odian, page 203, and are not limited to the above described examples.

The thermal polymerization initiator may be included in the concentration of about 0.001 wt % to about 0.5 wt %, based on the monomer composition. If the concentration of the thermal polymerization initiator is too low, additional thermal polymerization may hardly occur, and thus, the effect according to the addition of the thermal polymerization initiator may be insignificant, and if the concentration of the thermal polymerization initiator is too high, the molecular weight of the superabsorbent polymer may be small, and the properties may become nonuniform.

And, the monomer composition may further comprise additives such as a thickener, a plasticizer, a preservation stabilizer, an antioxidant, a neutralizing agent, etc., as necessary. As the additives, various additives widely used in the field relating to superabsorbent polymer may be used without specific limitations.

The above explained raw materials such as water soluble ethylenically unsaturated monomers, photopolymerization initiator, thermal polymerization initiator, internal crosslinking agent and additives may be added while being dissolved in a solvent.

Here, the solvent that can be used is not limited in terms of its construction as long as it can dissolve the above explained components, and for example, water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, or a mixture thereof may be used.

The solvent may be included in the remaining amount excluding the above-explained components, based on the total amount of the monomer mixture.

Meanwhile, a method of forming hydrogel polymer by the thermal polymerization or photopolymerization of the monomer composition is not specifically limited in terms of its construction, as long as it is a commonly used polymerization method.

Specifically, the polymerization method is largely classified into thermal polymerization and photopolymerization according to energy source, and commonly, thermal polymerization may be progressed in a reactor equipped with a stirring axis such as a kneader, and photopolymerization may be progressed in a reactor equipped with a movable conveyer belt, but the above explained polymerization methods are no more than examples, and the present invention is not limited thereto.

And, the polymerization temperature of the monomer mixture may be controlled to about 40° C. to 90° C., thus effectively inducing the vaporization of volatile organic solvents and the polymerization of hydrogel polymer in which pores are formed.

Here, a means to achieve the above explained polymerization temperature range is not specifically limited. A heating medium may be supplied, or a heat source may be directly supplied to heat. As the heating medium that can be used, steam, hot air, temperature-increased fluid such as hot oil, etc. may be used, but is not limited thereto, and the temperature of the supplied heating medium may be appropriately selected considering the means of heat medium, temperature increasing speed and target temperature to be increased. Meanwhile, as the directly supplied heat source, electric heating and gas heating may be mentioned, but is not limited thereto.

And, the polymerization time of the monomer mixture may be controlled to 30 seconds to 10 minutes, thus forming hydrogel polymer with an optimized pore structure.

For example, hydrogel polymer may be obtained by supplying hot wind into a reactor equipped with a stirring axis such as a kneader or heating the reactor, thereby progressing thermal polymerization, and the hydrogel polymer discharged to the outlet of the reactor may be in the form of a few centimeters to a few millimeters according to the shape of the stirring axis equipped in the reactor. Specifically, the size of obtained hydrogel polymer may vary according to the concentration of the introduced monomer composition and the introduction speed, and so on, and commonly, hydrogel polymer having a (weight average) particle diameter of 2 mm to 50 mm may be obtained.

And, in case photopolymerization is progressed in a reactor equipped with a movable conveyer belt as explained above, the obtained hydrogel polymer may be in the form of a sheet having the width of the belt. Here, the thickness of the polymer sheet may vary according to the concentration of the introduced monomer composition and the introduction speed, but, commonly, a monomer composition is preferably fed such that polymer in the form of a sheet having a thickness of about 0.5 cm to about 5 cm may be obtained. In case a monomer composition is fed such that the thickness of sheet-shaped polymer may be too thin, production efficiency may be low, and if the thickness of the sheet-shaped polymer is greater than 5 cm, due to the too thick thickness, a polymerization reaction may not uniformly occur throughout the whole thickness.

The hydrogel polymer obtained by such a method may exhibit a moisture content of about 40 wt % to about 80 wt %. Here, the "moisture content" is the content of occupying moisture based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. At this time, the drying condition is established such that the temperature is raised from room temperature to about 180° C. and then maintained at 180° C., and the total drying time is 20 minutes including a temperature raising step of 5 minutes.

And, after the crosslinking polymerization of the monomers, base resin powder may be obtained through the processes of drying, grinding and sieving, etc., and it is preferable that the base resin powder and superabsorbent polymer obtained therefrom is prepared and provided with a particle diameter of about 150 μm to 850 μm. More specifically, at least about 95 wt % of the base resin powder and superabsorbent polymer obtained therefrom may have a particle diameter of about 150 μm to 850 μm, and less than about 3 wt % thereof may have a particle diameter of less than about 150 μm.

As such, since the particle diameter distribution of the base resin powder and superabsorbent polymer is controlled to a preferable range, the finally prepared superabsorbent polymer may exhibit the above explained properties and more excellent permeability.

Meanwhile, the method of progressing drying, grinding and sieving will be explained below.

First, in the step of drying hydrogel polymer, if necessary, in order to increase the efficiency of the drying step, a step of coarsely grinding may be conducted before drying.

Here, grinders that can be used in the coarsely grinding is not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but is not limited thereto.

The coarsely grinding step may be progressed such that the particle diameter of hydrogel polymer may become about 2 mm to about 10 mm.

Grinding to a particle of less than 2 mm would not be technically easy due to the high moisture content of the hydrogel polymer, and may generate agglomeration between the ground particles. Meanwhile, if grinding to a particles diameter greater than 10 mm, the effect of increasing the efficiency of the subsequent drying step may be insignificant.

The hydrogel polymer coarsely-ground as explained above, or hydrogel polymer immediately after polymerization without passing the coarsely grinding step is dried. Here, the drying temperature may be about 50° C. to about 250° C. If the drying temperature is less than about 50° C., a drying time may too lengthen, and the properties of the finally prepared superabsorbent polymer may be deteriorated, and if the drying temperature is greater than about 250° C., only the surface of hydrogel polymer may be dried, thus generating a lot of fine particles in the grinding process as described below, and the properties of the finally prepared superabsorbent polymer may be degraded. More preferably, the drying may be progressed at a temperature of about 150° C. to about 200° C., more preferably at about 160° C. to about 190° C.

Meanwhile, the drying may be progressed for about 20 minutes to about 15 hours considering the process efficiency, etc., but the drying time is not limited thereto.

And, the drying method is not limited in terms of the construction as long as it can be commonly used as a drying process of hydrogel polymer. Specifically, in the drying step, hot wind supply, infrared ray irradiation, ultrahigh frequency wave irradiation, or UV irradiation, etc., may be applied. The polymer dried by such a method may exhibit a moisture content of about 0.05 wt % to about 10 wt %.

Next, a step of grinding the dried polymer obtained through the drying step is progressed.

The particle diameter of the polymer powder obtained after grinding may be about 150 μm to about 850 μm. As a grinder for grinding to such a particle diameter, specifically, a pin mill, a hammer mill, a screw mill, a roll mill, a disc mill, or a jog mill, etc. may be used, but the grinder is not limited thereto.

And, in order to manage the properties of the finally productized superabsorbent polymer after the grinding step, a step of sieving the polymer powder obtained after grinding according to the particle diameter may be conducted. Preferably, polymer with a particle diameter of about 150 μm to about 850 μm may be sieved, and only the polymer powder having such particle diameters may be additionally passed through the step of surface crosslinking reaction, etc., as necessary, to productize it.

Meanwhile, after progressing the process of forming base resin powder, the method for preparing superabsorbent polymer of one embodiment may comprise the step of mixing the base resin powder with a surface crosslinking solution comprising first inorganic material and a surface crosslinking agent to form a surface crosslinked layer.

The first inorganic material may be introduced during the process of surface crosslinking, so as to simultaneously improve permeability and absorption speed of the superabsorbent polymer. In the method for preparing superabsorbent polymer of one embodiment, by dispersing first inorganic material in the surface crosslinking solution when forming a surface crosslinked layer, and introducing the first inorganic material on the surface simultaneously with surface crosslinking, the inorganic material can be effectively prevented from leaving the superabsorbent polymer. Thereby, in the preparation method according to one embodiment, even if a very small amount of inorganic material is used, the effect of simultaneously improving permeability and absorption speed can be sufficiently exhibited.

Specifically, the first inorganic material included in the surface crosslinked layer may contact the surface of the base resin powder. That is, in the preparation method according to one embodiment, in the process of forming a surface crosslinked layer on the base rein powder, the first inorganic material is introduced into the surface crosslinking solution while being uniformly dispersed, and thus, the first inorganic material may exist while being dispersed even in the surface crosslinked layer. Thus, the first inorganic material that exists while being dispersed in the surface crosslinked layer formed on the surface of base resin powder, may also contact the surface of the base resin powder.

To the contrary, for example, in case a surface crosslinked layer is first formed on base resin powder, and then, first inorganic material is fixed while progressing surface crosslinking again on the surface crosslinked layer, contact of the first inorganic material included in the surface crosslinked layer with the surface of base resin powder is blocked, and a part of added inorganic material may not be positioned in the crosslinked structure and leave, and thus, it may be difficult to sufficiently secure permeability of the base resin powder, and as the thickness of the surface crosslinked layer increases, the particle diameter of the whole superabsorbent polymer particles may also increase.

In the step of forming a surface crosslinked layer, the content of the first inorganic material may be 0.001 parts by weight to 1 part by weight, or 0.005 parts by weight to 0.5 parts by weight, based on 100 parts by weight of the based resin powder. As such, the superabsorbent polymer prepared by adding a small amount of inorganic material may exhibit excellent permeability and absorption speed without decrease in absorbency under load due to a large quantity of inorganic material.

In the surface crosslinking solution, the surface crosslinking agent and the first inorganic material may be included together. and they may exist while being respectively dispersed, wherein the dispersed first inorganic material may represent the above explained weight ratio. If the content of the first inorganic material excessively increases compared to the base resin powder, it may be difficult for surface crosslinking to smoothly progress due to the first inorganic material, and it may difficult to realize sufficient absorbency under load.

And, if the content of the first inorganic material excessively decreases compared to the base resin powder, it may be difficult to realize the effect of securing solution permeability and absorption speed and inhibiting agglomeration by the first inorganic material.

Examples of the first inorganic material are not significantly limited, and for example, one or more selected from the group consisting of silica, clay, alumina, silica-alumina composite, titania, zinc oxide, and aluminum sulfate may be used. Such first inorganic material may be used in the form of powder or liquid, and particularly, silica powder, alumina powder, silica-alumina powder, titania powder, nano silica solution, or a mixture of two or more kinds thereof may be used.

More specifically, examples of the first inorganic material may include silica or alumina, and the surface of the silica or alumina may be positively charged. As such, since the surface of silica or alumina may be positively charged, the silica or alumina may inhibit agglomeration between base resin powder introduced into the surface crosslinked layer or finally prepared superabsorbent polymer.

And, the diameter of the alumina may be 1 nm to 100 nm. That is, the surface crosslinking solution is a kind of a colloid solution, and silica or alumina particles have the same charge in the solution, and thus, they may oppose to each other and be stably dispersed without agglomeration.

And, the alumina may have a BET specific surface area of 50 $m^2/g$ to 200 $m^2/g$. Thus, if the silica or alumina is introduced into the surface crosslinked layer, permeability and absorption speed of superabsorbent polymer may be improved, and hygrosocpicity may be secured to the almost equivalent level, compared to before introduction thereof.

The surface crosslinking solution may further comprise one or more kinds of solvents selected from the group consisting of water, ethanol, ethyleneglycol, diethyleneglycol, triethyleneglycol, 1,4-butandiol, propyleneglycol, ethyleneglycol monobutylether, propyleneglycol monomethylether, propyleneglycol monomethyl ether acetate, methyl ethyl ketone, acetone, methyl amyl ketone, cyclohexanone, cyclopentanone, diethyleneglycol monomethyl ether, diethyleneglycol ethyl ether, toluene, xylene, butyrolactone, carbitol, methyl cellosolve acetate and N,N-dimethylacetamide.

And, in the process of surface crosslinking, in addition to the inorganic material, multivalent metal cations may be added to progress surface crosslinking. Thereby, the surface crosslinked structure of superabsorbent polymer may be further optimized. It is predicted that this is because the metal cation may form a chelate with the carboxyl group (COOH) of superabsorbent polymer, thereby further reducing the crosslinking distance.

The surface crosslinked layer may be formed using surface crosslinking agents previously used for the preparation of superabsorbent polymer. As the surface crosslinking agent, those known in the technical field to which the present invention pertains may be used without specific limitations. More specific examples thereof may include polyols such as ethyleneglycol, propyleneglycol, 1,4-butandiol, 1,6-hexandiol, 1,2-hexandiol, 1,3-hexandiol, 2-methyl-1,3-propandiol, 2,5-hexandiol, 2-methyl-1,3-pentandiol, 2-methyl-2,4-pentandiol, tripropyleneglycol and glycerol; carbonate-based compounds such as ethylene carbonate and propylene carbonate; or epoxy compounds such as polyethylene glycol diglycidyl ether, etc. The surface crosslinking agent may be used in the content of about 0.01 to 4 parts by weight, based on 100 parts by weight of the base resin powder.

Meanwhile, in the step of forming a surface crosslinked layer, a thickener may be further included in the surface crosslinking solution. If the surface of base resin powder is additionally crosslinked in the presence of a thickener, property degradation may be minimized even after grinding.

More specifically, as the thickener, one or more selected from polysaccharides and hydroxyl-containing polymer may be used.

Among them, as the polysaccharide, a gum-based thickener, a cellulose-based thickener, etc. may be used. Specific examples of the gum-based thickener may include xanthan gum, arabic gum, karaya gum, tragacanth gum, ghatti gum, guar gum, locust bean gum and *psyllium* seed gum, etc. and specific examples of the cellulose-based thickener may include hydroxypropyl methyl cellulose, carboxymethyl cellulose, methylcellulose, hydroxymethyl cellulose, hydroxyethyl cellulose, hydroxypropyl cellulose, hydroxyethyl methyl cellulose, hydroxymethyl propyl cellulose, hydroxyethyl hydroxypropyl cellulose, ethyl hydroxyethyl cellulose and methyl hydroxypropyl cellulose, etc. Meanwhile, specific examples of the hydroxy-containing polymer may include polyethylene glycol and polyvinyl alcohol, etc.

By heating the base resin powder to which the surface crosslinking agent is added to about 100° C. or more, a surface crosslinking reaction may be achieved. Particularly, in order to prepare superabsorbent polymer with good properties, the surface crosslinking process conditions may be controlled to the maximum reaction temperature of about 100° C. or more, or about 120° C. to 200° C., and the maintenance time at the maximum reaction temperature of about 20 minutes or more, or about 20 minutes or more and 1 hour or less. And, a time for increasing temperature from the initial temperature when the reaction begins, for example, at a temperature of about 100° C. or more, or about 120° C. to 200° C., to the above described maximum reaction temperature, may be controlled to about 10 minutes or more, or about 10 minutes or more and 1 hour or less, and it was confirmed that superabsorbent polymer with good properties can be prepared by fulfilling the above explained surface crosslinking process conditions.

A means to increase temperature for the surface crosslinking reaction is not specifically limited. A heating medium may be supplied, or a heat source may be directly supplied to heat. As the heating medium that can be used, steam, hot air, temperature-increased fluid such as hot oil, etc. may be used, but is not limited thereto, and the temperature of the supplied heat medium may be appropriately selected considering the means of heating medium, temperature increasing speed and target temperature to be increased. Meanwhile, as the directly supplied heat source, electric heating and gas heating may be mentioned, but is not limited thereto.

Meanwhile, after progressing the above explained surface crosslinking process, the method for preparing superabsorbent polymer of one embodiment may comprise the step of adding second inorganic material to base resin powder on which the surface crosslinked layer is formed.

By further adding the second inorganic material to superabsorbent resin powder on which a surface crosslinked layer is formed, the second inorganic material may be additionally dispersed on the surface crosslinked layer, thus effectively realizing the effects of securing absorbency under load and improving solution permeability of the finally prepared superabsorbent polymer, and inhibiting agglomeration.

The first inorganic material and the second inorganic material are respectively defined as inorganic material added to the surface crosslinking solution when forming a surface crosslinking layer and inorganic material added after forming a surface crosslinking layer, and specific components thereof may be identical to or different from each other.

In the step of adding the second inorganic material, the content of the second inorganic material may be 0.001 parts by weight to 1 part by weight, or 0.005 parts by weight to 0.5 parts by weight, or 0.01 parts by weight to 0.2 parts by weight, based on 100 parts by weight of the base resin powder. If the content of the second inorganic material excessively increases compared to the base resin powder, the rate of loss of the second inorganic material due to the failure to be introduced on the surface of base resin powder may increase and process efficiency may decrease, and the properties of the finally prepared superabsorbent polymer may decrease. If the content of the second inorganic material excessively decreases compared to the base resin powder, it may be difficult to sufficiently realize the effects of securing absorbency under load and inhibiting agglomeration by the second inorganic material.

Specifically, as the second inorganic material, for example, one or more selected from the group consisting of silica, clay, alumina, silica-alumina composite, titania, zinc oxide, and aluminum sulfate may be used. Such second inorganic material may be used in the form of powder or liquid, and particularly, silica powder, alumina powder, silica-alumina powder, titania powder, nano silica solution, or a mixture of two or more kinds thereof may be used.

More specifically, examples of the first inorganic material may include alumina, and the surface of the alumina may be positively charged. As such, since the surface of alumina may be positively charged, the alumina may reduce agglomeration between base resin powder introduced into the surface crosslinked layer or finally prepared superabsorbent polymer.

And, the diameter of the alumina may be 1 nm to 100 nm. And, the alumina may have a BET specific surface area of 50 $m^2/g$ to 200 $m^2/g$. Thus, if the alumina is introduced into the surface crosslinked layer, permeability and absorption speed of superabsorbent polymer may be improved, and hygrosocpicity may be secured to the almost equivalent level, compared to before introduction thereof.

Meanwhile, the content of the second inorganic material may be 1 part by weight to 2000 parts by weight, or 10 parts by weight to 1500 parts by weight, or 1 part by weight to 500 parts by weight, or greater than 500 parts by weight and 2000 parts by weight or less, or 10 parts by weight to 200 parts by weight, or 700 parts by weight to 1500 parts by weight, based on 100 parts by weight of the first inorganic material.

By respectively adding the first inorganic material and the second inorganic material, compared to the case wherein neither the first inorganic material nor the second inorganic material is added, or wherein only one of the first inorganic material and the second inorganic material is added, the effects of securing absorbency under load of the finally prepared superabsorbent polymer, inhibiting agglomeration, and improving solution permeability may be further improved.

If the content of the second inorganic material excessively increased compared to the first inorganic material, the rate of loss of the second inorganic material due to the failure to be introduced on the surface of base resin powder may increase, and thus, process efficiency may decrease, and the properties of the finally prepared superabsorbent polymer may decrease. If the content of the second inorganic material excessively decrease compared to the first inorganic material, it may be difficult to sufficiently realize the effects of securing absorbency under load and inhibiting agglomeration by the second inorganic material.

And, the content ratio of the first inorganic material and the second inorganic material may vary according to the properties and purpose of use of the superabsorbent polymer. For specific example, in case the superabsorbent polymer is prepared with the purpose of enhancing agglomeration prevention property, the content of the second inorganic material may be greater than 500 parts by weight and 2000 parts by weight or less, or 700 parts by weight to 1500 parts by weight, or 900 parts by weight to 1300 parts by weight, based on 100 parts by weight of the first inorganic material.

And, in case the superabsorbent polymer is prepared with the purpose of enhancing solution permeability, the content of the second inorganic material may be 1 part by weight to 500 parts by weight, or 10 parts by weight to 200 parts by weight, or 20 parts by weight to 100 parts by weight, based on 100 parts by weight of the first inorganic material.

A method of adding the second inorganic material to the base resin powder on which a surface crosslinked layer is formed is not limited in terms of its construction. For example, a method of introducing inorganic material and base resin powder in a reactor and mixing them, a method of spraying inorganic material to base resin powder, a method of continuously supplying base resin powder and inorganic material to a continuously operated mixer, etc. may be used.

When the second inorganic material is added, water and methanol may be mixed together and additionally added. The addition of water and methanol has an advantage in that inorganic material may be uniformly dispersed in the base resin powder.

And, after progressing the above explained surface crosslinking process, the method for preparing superabsorbent polymer of one embodiment may further comprise the step of crushing the surface crosslinked superabsorbent polymer.

As used herein, the term 'crushing' is used as the same meaning as 'grinding'.

The crushing of the superabsorbent polymer may be conducted using a grinder for coarse grinding of the above explained hydrogel polymer, or a grinder for grinding dried hydrogl polymer. Thus crushed and obtained superabsorbent polymer may have a particle diameter of about 150 µm to about 850 µm. And, the crushed superabsorbent polymer may be further sieved to obtain superabsorbent polymer with the aimed particle diameter.

Meanwhile, according to another embodiment of the invention, superabsorbent polymer comprising base resin powder comprising crosslinked polymer of water soluble ethylenically unsaturated monomers having acid groups of which at least a part are neutralized; a surface crosslinked layer formed on the base resin powder, comprising first inorganic material; and second inorganic material formed on the surface of the surface crosslinked layer, wherein the second inorganic material comprises alumina with a BET specific surface area of 50 $m^2/g$ to 200 $m^2/g$, is provided. The BET specific surface area is measured using a BET analyzer.

The superabsorbent polymer may be obtained by the preparation method of superabsorbent polymer of one embodiment. The details of the ethylenically unsaturated monomers, base resin powder, surface crosslinked layer, first inorganic material and second inorganic material are as explained above.

Particularly, the content of the second inorganic material may be 1 part by weight to 2000 parts by weight, or 10 parts by weight to 1500 parts by weight, or 1 part by weight to 500 parts by weight, or greater than 500 parts by weight and 2000 parts by weight or less, or 10 parts by weight to 200 parts by weight, or 700 parts by weight to 1500 parts by weight, based on 100 parts by weight of the first inorganic material.

By respectively adding the first inorganic material and the second inorganic material, compared to the case wherein neither the first inorganic material nor the second inorganic material are added, or wherein only one of the first inorganic material and the second inorganic material is added, the effects of securing absorbency under load of the finally prepared superabsorbent polymer, inhibiting agglomeration, and improving solution permeability may be further improved.

If the content of the second inorganic material excessively increased compared to the first inorganic material, the rate of loss of the second inorganic material due to the failure to be introduced on the surface of base resin powder may increase, and thus, process efficiency may decrease, and the properties of the finally prepared superabsorbent polymer may decrease. If the content of the second inorganic material excessively decrease compared to the first inorganic material, it may be difficult to sufficiently realize the effects of securing absorbency under load and inhibiting agglomeration by the second inorganic material.

And, the first inorganic material include in the surface crosslinked layer may contact the surface of the base resin powder. Since the first inorganic material may exist while being uniformly dispersed in the surface crosslinked layer, the first inorganic material that exist while being dispersed in the surface crosslinked layer formed on the surface of base resin powder, may also contact the surface of the base resin powder.

The first inorganic material and second inorganic material are identical or different, and each independently, may include one or more selected from the group consisting of silica, clay, alumina, silica-alumina composite, titania, zing oxide and aluminum sulfate.

More specifically, examples of the first inorganic material may include silica or alumina, and the surface of the silica or alumina may be positively charged. As such, since the surface of silica or alumina may be positively charged, the silica or alumina may reduce agglomeration between base resin powder introduced into the surface crosslinked layer or finally prepared superabsorbent polymer.

And, examples of the second inorganic material may include alumina, and the surface of the alumina may be positively charged. As such, since the surface of alumina may be positively charged, the alumina may reduce agglomeration between base resin powder introduced into the surface crosslinked layer or finally prepared superabsorbent polymer.

And, the diameter of the alumina may be 1 nm to 100 nm. And, the alumina may have a BET specific surface area of 50 $m^2/g$ to 200 $m^2/g$. Thus, if the silica or alumina is introduced inside of the surface crosslinked layer or outside of the surface crosslinked layer, permeability and absorption speed of superabsorbent polymer may be improved, and hygrosocpicity may be secured to the almost equivalent level, compared to before introduction.

The superabsorbent polymer may have absorbency under load decrease rate of −20% to 0%, or −15% to 0%. as measured at 0.7 psi of the following Equation 1.

$$\text{Decrease rate of absorbency under load of 0.7 psi (\%)} = \{(A1-A0)/A0\}*100 \qquad \text{[Equation 1]}$$

in the Equation 1,

A0 is the absorbency under load value of superabsorbent polymer that does not comprise first inorganic material and second inorganic material, calculated by the following Equation 2

A1 is the absorbency under load value of superabsorbent polymer that comprises first inorganic material and second inorganic material, calculated by the following Equation 2

$$\text{AUL(g/g) of 0.7 psi} = [W_2(g)-W_1(g)]/W_0(g) \qquad \text{[Equation 2]}$$

in the Equation 2, $W_0$ (g) is the initial weight of superabsorbent polymer (g), $W_1$ (g) is the sum of the weight of superabsorbent polymer and the weight of a device capable of giving a load to the superabsorbent polymer, $W_2$ (g) is the sum of the weight of superabsorbent polymer and the weight of a device capable of giving a load to the superabsorbent polymer, after absorbing a saline solution into the superabsorbent polymer under a load of 0.7 psi for 1 hour.

As such, since the superabsorbent polymer has very low absorbency under load decrease rate of −20% to 0%, as measured at 0.7 psi of the above Equation 1, it may maintain permeability while reducing agglomeration.

In addition, the superabsorbent polymer of another embodiment may exhibit good basic absorption capacity. More specifically, if basic absorption capacity is evaluated after obtaining the superabsorbent polymer, the following properties may be exhibited. That is, the superabsorbent polymer may have exhibit the properties wherein centrifuge retention capacity (CRC) for a saline solution is 33 to 35 g/g, absorption under load (AUL) of 0.7 psi for a saline solution is 14 to 16 g/g, a time for removing vortex generated when stirring 50 ml of a 0.9 wt % NaCl solution at 600 rpm is 25 seconds to 35 seconds, or 28 seconds to 32 seconds, and an anti-caking efficiency is 90% to 100%.

The absorbency under load (AUL) of 0.7 psi may be measured according to EDANA method WSP 242.2. More specifically, the absorbency under load may be calculated according to the following Equation 2, after absorbing a saline solution into superabsorbent polymer under load of about 0.7 psi over 1 hour.

$$AUL(g/g) \text{ of } 0.7 \text{ psi} = [W_2(g) - W_1(g)]/W_0(g) \quad \text{[Equation 2]}$$

in the Equation 2,
$W_0$ (g) is the initial weight of superabsorbent polymer (g), $W_1$ (g) is the sum of the weight of superabsorbent polymer and the weight of a device capable of giving a load to the superabsorbent polymer, $W_2$ (g) is the sum of the weight of superabsorbent polymer and the weight of a device capable of giving a load to the superabsorbent polymer, after absorbing a saline solution into the superabsorbent polymer under a load of 0.7 psi for 1 hour.

And, the anti-caking efficiency may be calculated by the following Equation 5:

$$\text{Anti-caking efficiency } (\%) = [W_6(g)/W_5(g)]*100 \quad \text{[Equation 5]}$$

in the Equation 5,
$W_5$ (g) is the initial weight of superabsorbent polymer (g), and $W_6$ (g) is the amount (g) of superabsorbent polymer dropped when the superabsorbent polymer is applied on a flask dish of 9 cm diameter, maintained in a constant temperature and humidity chamber of temperature of 40±3° C. and humidity of 80±3% for 10 minutes, and cooled at room temperature for 5 minutes, and then, the flask dish is turned upside down on a filter paper.

And, centrifuge retention capacity (CRC) for a saline solution may be measured according to EDANA method WSP 241.2. The centrifuge retention capacity may be calculated by the following Equation 7, after getting a saline solution absorbed into superabsorbent polymer over 30 minutes.

$$CRC(g/g) = \{[W_8(g) - W_7(g)]/W_0(g)\} - 1 \quad \text{[Equation 7]}$$

In the Equation 7,
$W_0$ (g) is the initial weight of superabsorbent polymer (g),
$W_7$ (g) is the weight of a tea bag, measured after dehydration using a centrifuge at 250 G for 3 minutes, without using superabsorbent polymer.
$W_8$ (g) is the weight of a tea bag including superabsorbent polymer, measured after superabsorbent polymer is immersed in a 0.9 wt % saline solution for 30 minutes to absorb, and then, dehydrated using a centrifuge at 250 G for 3 minutes.

The superabsorbent polymer may have the content of the second inorganic material of greater than 500 parts by weight and 2000 parts by weight or less, or 700 parts by weight to 1500 parts by weight, or 900 parts by weight to 1300 parts by weight, based on 100 parts by weight of the first inorganic material, so that the superabsorbent polymer may fulfill absorbency under load decrease rate of −20% to 0%, as measured at 0.7 psi of the above Equation 1.

Meanwhile, the superabsorbent polymer may have absorbency under load decrease rate of −15% to 0%, or −11% to 0%, as measured at 0.9 psi of the following Equation 3.

$$\text{Decrease rate of absorbency under load of 0.9 psi} \\ (\%) = \{(A3 - A2)/A2\}*100 \quad \text{[Equation 3]}$$

in the Equation 3,
A2 is the absorbency under load value of superabsorbent polymer that does not comprise first inorganic material and second inorganic material, calculated by the following Equation 4,
A3 is the absorbency under load value of superabsorbent polymer that comprises first inorganic material and second inorganic material, calculated by the following Equation 4, $$AUL(g/g) \text{ of } 0.9 \text{ psi} = [W_4(g) - W_3(g)]/W_0(g) \quad \text{[Equation 4]}$$

in the Equation 4,
$W_0$ (g) is the initial weight of superabsorbent polymer (g), $W_3$ (g) is the sum of the weight of superabsorbent polymer and the weight of a device capable of giving a load to the superabsorbent polymer, $W_4$ (g) is the sum of the weight of superabsorbent polymer and the weight of a device capable of giving a load to the superabsorbent polymer, after absorbing a saline solution into the superabsorbent polymer under a load of 0.9 psi for 1 hour.

As such, since the superabsorbent polymer has very low absorbency under load decrease rate of −15% to 0%, as measured at 0.9 psi of the Equation 3, it may maintain permeability while reducing agglomeration.

In addition, the superabsorbent polymer of another embodiment may exhibit good basic absorption capacity. More specifically, if basic absorption capacities are evaluated after obtaining the superabsorbent polymer, the following properties may be exhibited. That is, the superabsorbent polymer may exhibit properties wherein centrifuge retention capacity (CRC) for a saline solution is 29 to 31 g/g, absorbency under load (AUL) of 0.9 psi for a saline solution is 19 to 21 g/g, free swell gel bed permeability (GBP) for a saline solution is 40 to 80 darcy, and a time for removing vortex generated when stirring 50 ml of a 0.9 wt % NaCl solution at 600 rpm is 35 seconds to 45 seconds, or 37 seconds to 43 seconds.

The absorbency under load (AUL) of 0.9 psi may be measured according to EDANA method WSP 242.2. More specifically, the absorbency under load may be calculated according to the following Equation 4, after a saline solution is absorbed into the superabsorbent polymer under a load of about 0.9 psi over 1 hour:

$$AUL(g/g) \text{ of } 0.9 \text{ psi} = [W_4(g) - W_3(g)]/W_0(g) \quad \text{[Equation 4]}$$

In the Equation 4,
$W_0$ (g) is the initial weight of superabsorbent polymer (g), $W_3$ (g) is the sum of the weight of superabsorbent polymer and the weight of a device capable of giving a load to the superabsorbent polymer, $W_4$ (g) is the sum of the weight of superabsorbent polymer and the weight of a device capable of giving a load to the superabsorbent polymer, after absorbing a saline solution into the superabsorbent polymer under a load of 0.9 psi for 1 hour.

And, centrifuge retention capacity (CRC) for a saline solution may be measured according to EDANA method WSP 241.2. More specifically, the centrifuge retention capacity may be calculated according to the following Equation 7, after a saline solution is absorbed into the superabsorbent polymer over 30 minutes:

$$CRC(g/g)=\{[W_8(g)-W_7(g)]/W_0(g)\}-1 \qquad [\text{Equation 7}]$$

In the Equation 7, $W_0$ (g) is the initial weight of superabsorbent polymer (g), $W_7$ (g) is the weight of a tea bag, measured after dehydration using a centrifuge at 250 G for 3 minutes, without using superabsorbent polymer, and $W_8$ (g) is the weight of a tea bag including superabsorbent polymer, measured after superabsorbent polymer is immersed in a 0.9 wt % saline solution for 30 minutes to absorb, and then, dehydrated using a centrifuge at 250 G for 3 minutes.

The gel bed permeability (GBP) for a saline solution may be measured as a unit of Darcy or $cm^2$ according to the method described in Patent Application No. 2014-7018005. 1 darcy means that liquid having a viscosity of 1 cP flows 1 mm per 1 second through 1 $cm^2$ under pressure gradient of 1 atm per 1 cm. The gel bed permeability has the same unit as an area, and 1 darcy is equivalent to $0.98692 \times 10^{-12}$ $m^2$ or $0.98692 \times 10^{-8}$ $cm^2$.

More specifically, GBP herein means gel bed permeability (GBP) under 0 psi swell pressure test, and the GBP may be measured using the devices shown in FIG. 1 to FIG. 3.

Referring to FIGS. 1 to 3, in a device for measuring GBP (500), a test device assembly (528) comprises a sample container (530) and a plunger (536). The plunger comprises a shaft (538) having cylinder holes bored down the longitudinal axis and a head (550) positioned at the bottom of the shaft. The diameter of the shaft hole (562) is about 16 mm. The plunger head is attached to the shaft by adhesive, for example. 12 holes (544) are bored on the radial axis of the shaft, and the diameters of three holes positioned every 90° are about 6.4 mm. The shaft (538) is mechanically processed from LEXAN bar or similar material, and has an outer diameter of about 2.2 cm and an inner diameter of about 16 mm. The plunger head (550) has 7 inner holes (560) and 14 outer holes (554), and the diameters of all the holes are about 8.8 mm And, a hole of about 16 mm is in a straight line with the shaft. The plunger head (550) is mechanically processed from LEXAN bar or similar material, has a height of about 16 mm and a diameter with minimum wall clearance, and is sized such that it fits inside a cylinder (534) but still freely moves. Although the total length of the plunger head (550) and the shaft (538) is about 8.25 cm, the upper part of the shaft may be mechanically processed to obtain a desired size of the plunger (536). The plunger (536) is biaxially stretched and thus tight, and comprises a 100 mesh stainless steel cloth screen (564) attached to the lower end of the plunger (536). The screen is attached to the plunger head (550) using an appropriate solvent that definitely adheres the screen to the plunger head (550). Care must be taken so as to avoid the movement of an excessive solvent to the opening of the screen to decrease the area of the opening for liquid flow. An acryl solvent Weld-on 4 of IPS Corporation (Gardena, Calif., USA) may be appropriately used. The sample container (530) comprises a cylinder (534) and a 400 mesh stainless steel cloth screen (566) that is biaxially stretched and thus tight, and is attached to the lower end of the cylinder (534). The screen is attached to the cylinder using an appropriate solvent that definitely adheres the screen to the cylinder. Care must be taken so as to avoid the movement of an excessive solvent to the opening of the screen to decrease the area of the opening for liquid flow. An acryl solvent Weld-on 4 of IPS Corporation (Gardena, Calif., USA) may be appropriately used. The gel particle sample (swollen superabsorbent polymer) indicated as 568 in FIG. 2 rests on the screen (566) inside the cylinder (534) during test.

The cylinder (534) may be prepared with an inner diameter of about 6 cm (for example, the cross sectional area is about 28.27 $cm^2$), a wall thickness of about 0.5 cm and a height of about 7.95 cm, by boring holes in a transparent LEXAN bar or similar material, or cutting LEXAN tubing or similar material. A step may be formed by mechanically processing the outer diameter of the cylinder (534) so that a region (534a) having an outer diameter of 66 mm exists at 31 mm from the bottom of the cylinder (534). An O-ring (540) for adjusting the diameter of the region (534a) may be positioned on the upper part of the step.

An annular weight (548) has a counter-bored hole with a diameter of about 2.2 cm and a depth of about 1.3 cm, and thus, freely slides on the shaft (538). The annular weight also has a thru-bore (548a) of about 16 mm. The annular weight (548) may be made of stainless steel or other suitable material capable of resisting corrosion by a 0.9 wt % saline solution (aqueous solution of sodium chloride). The combined weight of the plunger (536) and the annular weight (548) is about 596 g, which corresponds to the pressure of about 0.3 psi or about 20.7 $dyne/cm^2$ (2.07 kPa) applied to the sample (568) over the sample area of about 28.27 $cm^2$.

During GBP test, when the test solution passes through the test device and flows, the sample container (530) is generally positioned on a weir (600). The purpose of the weir is to divert overflowed liquid at the upper part of the sample container (530), and the overflowed liquid is diverted to a separate collector (601). The weir is placed on a balance (602) on which a beaker (603) is positioned, thus collecting a saline solution passing through the swollen sample (568).

In order to conduct gel bed permeability test under "free swell" condition, a plunger (536) equipped with a weight (548) is placed in an empty sample container (530), and the height from the top of the weight (548) to the bottom of the sample container (530) is measured to the accuracy of 0.01 mm using an appropriate gauge. During the measurement, force applied by thickness gauge should be small as possible, and preferably is less than about 0.74 N. In case a multiple test device is used, it is important to maintain each empty sample container (530), plunger (536) and weight (548) and tracks in which they are used.

And, it is preferable that a base on which the sample container (530) is placed is flat, and the surface of the weight (548) is parallel to the surface of the bottom of the sample container (530). And, a sample to be tested is prepared from superabsorbent polymer of which GBP is to be measured. For example, a test sample is prepared from superabsorbent polymer with a particle diameter of about 300 to about 600 μm, which passes through US standard 30 mesh screen, and remains on US standard 50 mesh screen. A sample of about 2.0 g is put in a sample container (53), and uniformly spread on the bottom of the sample container. Subsequently, the container that is filled with 2.0 g of the sample and does not contain a plunger (536) and a weight (548) is soaked in a 0.9 wt % saline solution for about 60 minutes so that the sample is swollen under no pressure. Here, the sample container (530) is put on a mesh positioned in a liquid reservoir so that the sample container (530) is slightly higher than the bottom of the liquid reservoir. As the mesh, those which do not have an influence on the movement of the saline solution to the sample container (530) may be used. As the mesh, part number 7308 of Eagle Supply and Plastic (Appleton, Wis., USA) may be used. During saturation, the height of the saline solution may be controlled so that the surface in the sample container is determined not by the saline solution but by the sample.

At the end of this period, an assembly of a plunger (536) and a weight (548) is put on the saturated sample (568) in the sample container (530), and then, the sample container (530), plunger (536), weight (548) and sample (568) are taken out of the solution. Thereafter, before measuring GBP, the sample container (530), plunger (536), weight (548) and sample (568) are left on a flat large-grid non-deformable plate with a uniform thickness for about 30 seconds. The plate may prevent the liquid in the sample container from being discharged onto the flat surface due to surface tension. The plate may have a total size of 7.6 cm×7.6 cm, and the size of each grid may be 1.59 cm length×1.59 cm width× 1.12 cm depth. Suitable plate material is a parabolic diffusion plate obtainable from McMaster Carr Supply Company (Chicago Ill. USA), catalogue number 1624K27, which may be cut to an appropriate size and used.

And, if a zero point has not been changed from the initial height measurement, the same thickness gauge as previously used is used to measure again the height from the top of the weight (548) to the bottom of the sample container (530). The measurement of the height should be conducted as soon as possible after installing the thickness gauge. The measurement value of the height of the empty assembly wherein a plunger (536) and a weight (548) are placed in an empty sample container (530) should be subtracted from the height measurement value obtained after saturating the sample (568). Thus obtained value is the thickness or height "H" of the saturated sample (568). And, if a plate is included in an assembly including the saturated sample (568), the height should be measured including the plate even when measuring the height of the empty assembly.

The GBP measurement begins with transferring a 0.9% saline solution into the sample container (530) containing a sample (568), a plunger (536) and a weight (548). The flow rate of the saline solution into the container is adjusted so that the saline solution is overflowed to the top of the cylinder (534), thereby exhibiting a consistent head pressure equivalent to the height of the sample container (530). The saline solution may be added by any means sufficient for securing a small but consistent amount of overflow from the top of the cylinder equipped with an instrument pump (604), etc. The overflowed liquid is diverted into a separate collector (601). Using a balance (602) and a beaker (603), the amount of the solution passing through the sample (568) to time is measured by a gravimetric method. Once overflow begins, data points are collected from the balance (602) every second for more than 60 seconds. The data may be acquired manually or using a data collection software. The flow rate (Q) passing through the swollen sample (568) is determined as g/sec by linear least-square fit of liquid (g) passing through the sample (568) to time (sec).

Using thus obtained data, GBP (cm²) may be calculated according to the following Equation 6, thus confirming gel bed permeability.

$$K=[Q*H*\mu]/[A*\rho*P] \quad \text{[Equation 6]}$$

In the Equation 6,
K is gel bed permeability (cm$^2$),
Q is flow rate (g/sec),
H is the height of swollen sample (cm),
$\mu$ is liquid viscosity (P)(the viscosity of the test solution used in this test is about 1 cP), A is the cross sectional area for liquid flow (for the sample container used in this test, 28.27 cm$^2$),
$\rho$ is liquid density (g/cm$^3$) (for the sample container used in this test, about 1 g/cm$^3$),
P is hydrostatic pressure (dyne/cm$^2$)(normally, about 7,797 dyne/cm$^2$).

The hydrostatic pressure is calculated from the Equation P=$\rho$*g*h, wherein $\rho$ is liquid density (g/cm$^3$), g is gravitational acceleration (nominally, 981 cm/sec$^2$), h is liquid height (for example, for the GBP test described herein, 7.95 cm).

The superabsorbent polymer may have the content of the second inorganic material of 1 part by weight to 500 parts by weight, or 10 parts by weight to 200 parts by weight, or 20 parts by weight to 100 parts by weight, based on 100 parts by weight of the first inorganic material, so that the superabsorbent polymer fulfill absorbency under load decrease rate of −15% to 0%, measured at 0.9 psi of the above Equation 3.

Meanwhile, according to still another embodiment of the invention, superabsorbent polymer comprising: base resin powder comprising crosslinked polymer of water soluble ethylenically unsaturated monomers having acid groups of which at least a part are neutralized; a surface crosslinked layer formed on the base resin powder, comprising first inorganic material; and second inorganic material formed on the surface of the surface crosslinked layer, wherein the anti-caking efficiency according to the following Equation 5 is 85% to 100%, is provided:

$$\text{Anti-caking efficiency (\%)}=[W_6(g)/W_5(g)]*100 \quad \text{[Equation 5]}$$

in the Equation 5,
$W_5$ (g) is the initial weight of superabsorbent polymer (g), and $W_6$ (g) is the amount (g) of superabsorbent polymer dropped when the superabsorbent polymer is coated on a flask dish of 9 cm diameter, maintained in a constant temperature and humidity chamber of temperature of 40±3° C. and humidity of 80±3% for 10 minutes, and cooled at ambient temperature for 5 minutes, and then, the flask dish is turned upside down on a filter paper.

As used herein, "ambient temperature" means room temperature, and for example, means a temperature of 20° C. to 30° C., preferably a temperature of 25° C.

The superabsorbent polymer may be obtained by the method for preparing superabsorbent polymer according to one embodiment. The details of the ethylenically unsaturated monomers, base resin powder, surface crosslinked layer, first inorganic material and second inorganic material are as explained in one embodiment or another embodiment described above.

The superabsorbent polymer may have the anti-caking efficiency according to the above Equation 5, of 85% to 100%, or 86% to 100%, 87% to 100%, 88% to 100%, 89% to 100%, 90% to 100%, 91% to 100%, 92% to 100%, 93% to 100%, 94% to 100%, 95% to 100%.

As such, the superabsorbent polymer of still another embodiment may exhibit high anti-caking efficiency, and thus, minimize caking generated due to moisture absorption in the air during transportation of the superabsorbent polymer, thereby realizing excellent durability.

Advantageous Effects

According to the present invention, a method for preparing superabsorbent polymer that not only has excellent permeability and absorption speed, but also has minimized absorbency under load decrease rate, and superabsorbent polymer prepared thereby are provided.

BRIEF DESCRIPTION OF DRAWINGS

FIGS. 1 to 3 are schematic diagrams of illustrative devices for measuring gel bed permeability and the parts equipped in the device.

DETAILED DESCRIPTION OF THE EMBODIMENTS

The present invention will be explained in detail in the following Examples. However, these examples are presented only as the illustration of the present invention, and the scope of the present invention is not limited to the following examples.

Examples 1 to 6: Preparation of Superabsorbent Polymer

Example 1

Into a 2 L glass beaker, 450 g of acrylic acid was put, and 693.88 g of the aqueous solution of 24% caustic soda was slowly poured to prepare a first solution. Here, heat of neutralization was generated, and the mixed solution was stirred at room temperature and cooled to about 41° C. Thereafter, a second solution wherein 0.225 g of polyethylene glycol diacrylate (PEGDA 600), 0.16 g of surfactant (S1670), and 0.045 g of dioctyl sulfosuccinate sodium salt (AOT) are added to 50 g of acrylic acid; 26 g of the aqueous solution of 4% sodium bicarbonate ($NaHCO_3$) (a third solution); 35 g of the aqueous solution of 0.31% ascorbic acid (a fourth solution); and a fifth solution wherein 1 g of hydrogen peroxide and 0.69 g of potassium persulfate are diluted in 40 g of distilled water; were sequentially added to the first solution.

When the solution stirred in the beaker became gel and the stirring stopped, it was immediately poured into a tray of vat form (width 15 cm×length 15 cm). The poured gel was foamed within around 20 seconds and slowly shrunken while polymerization progressed. The sufficiently shrunken polymer was torn off into 5 to 10 pieces and transferred into a kneader, and the lid was closed and kneading was progressed for 5 minutes. In the process of kneading, when 4 minutes elapsed from the beginning, the lid was opened and 50 g of the aqueous solution of 3.5% potassium persulfate was sprayed to the polymer inside of the kneader, and then, the lid was closed.

Thereafter, the polymer was passed through a hole with a diameter of 13 mm using a meat chopper and prepared into crump.

Subsequently, in an oven capable of transferring air volume up and down, the crump was dried. Hot air of 180° C. was allowed to flow from the lower part to the upper part for 15 minutes so that moisture content of the dried crump became about 2% or less, and allowed to flow again from the upper part to the lower part for 15 minutes, thus uniformly drying the crump.

Thereafter, the dried crump was ground with a grinder, and then, sieved to obtain base resin of 150 μm to 850 μm.

Thereafter, to a surface crosslinking solution comprising 3.5 g of water, 3.5 g of methanol, and 0.075 g of polyethylene glycol diglycidyl ether (EX810), 0.01 g of a silica compound (Aerosil 200, EVONIK Company) was added and dispersed, 100 g of base resin was mixed with the surface crosslinking solution, and a surface crosslinking reaction was progressed at 135° C. for 35 minutes.

And, to the product of the surface crosslinking reaction, 0.09 g of an alumina compound (Aeroxide Alu 130, EVONIK Company) was additionally added and mixed, and the obtained product was sieved using US standard 20 mesh screen and US standard 170 mesh screen, thus obtaining crushed superabsorbent polymer with a particle diameter of about 90 μm to about 850 μm.

Example 2

Superabsorbent polymer was prepared by the same method as Example 1, except that after the surface crosslinking reaction, the alumina compound (Aeroxide Alu 130, EVONIK Company) was added to the product of the surface crosslinking reaction in the amount of 0.13 g and mixed.

Example 3

A 24% caustic soda solution was prepared by mixing 647.14 g of the aqueous solution of 32% caustic soda with 215.9 g of distilled water (solution A).

19.42 g of a solution wherein IRGACURE 819 initiator is diluted in acrylic acid to 0.21% (solution B), 20.91 g of a solution wherein polyethylene glycol diacrylate (PEGDA, average molecular weight 400) is diluted in acrylic acid to 5% (solution C), and 13.86 g of a solution wherein trimethylol propane triacrylate containing 9 mo % of ethylene oxide (Ethoxylated-TMPTA, TMP(EO)9TA, M-3190 Miwon Specialty Chemical Co., Ltd.) is diluted in acrylic acid to 5% (solution D) were all mixed with 454.53 g of acrylic acid to prepare a solution E.

Into a glass reactor of 2 L capacity surrounded by jacket in which a heating medium precooled to 25° C. circulates, the solution E was introduced. And, into the glass reactor, the solution A was slowly added dropwise to prepare a solution F. When adding the solution A dropwise, temperature increased to about 72° C. or more by the heat of neutralization, and thus, it was waited until the mixed solution was cooled to about 43° C. In the obtained mixed solution, the degree of neutralization of acrylic acid was about 70 mol %.

In a 2 L plastic beaker, 25.5 g of the aqueous solution of 4% sodium persulfate and 2.7 g of the aqueous solution of 1% surfactant (S1670) were mixed, and the cooled solution F was moved into the plastic beaker using an outlet at the bottom of the glass reactor. Subsequently, 25.5 g of the aqueous solution of 4% sodium bicarbonate ($NaHCO_3$) was put in the plastic beaker and mixed.

Subsequently, into a tray of Vat form (width 15 cm×length 15 cm) installed in a square polymerization reactor, on top of which a light irradiation device is installed, of which inside is preheated to 80° C., the above prepared mixed solution was poured, and light was irradiated. It was confirmed that gel was formed on the surface about 23 seconds after light irradiation, and a polymerization reaction occurred about 30 seconds after light irradiation. Thereafter, a polymerization reaction was progressed for further 2 minutes, and the polymerized sheet was taken out to cut into a size of 5 cm×5 cm. And, the cut sheet was prepared into crump through a chopping process using a meat chopper.

Subsequently, the crump was dried in an oven capable of transferring air volume up and down. Hot air of 180° C. was allowed to flow for 15 minutes from the lower part to the upper part so that moisture content of the dried crump become about 2% or less, and was allowed to flow again for 15 minutes from the upper part to the lower part, thus uniformly drying the crump. The dried crump was ground with a grinder, and then, sieved to obtain base resin with a size of 150 μm to 850 μm.

Thereafter, to a surface crosslinking solution comprising 3 g of water, 3.5 g of methanol, and 0.4 g of ethylene carbonate, 0.1 g of a silica compound (Aerosil 380, EVONIK Company) was added and dispersed, and the surface crosslinking solution was mixed with 100 g of base resin, and then, surface crosslinking reaction was progressed at 190° C. for 50 minutes.

And, to the product of the surface crosslinking reaction, 0.03 g of an alumina compound (Aeroxide Alu 130, EVONIK Company) was additionally added, and the obtained superabsorbent polymer was sieved using US standard 20 mesh screen and US standard 170 mesh screen, thus obtaining crushed superabsorbent polymer with a particle diameter of about 90 μm to about 850 μm.

Example 4

Superabsorbent polymer was prepared by the same method as Example 3, except that after the surface crosslinking reaction, the alumina compound (Aeroxide Alu 130, EVONIK Company) was added to the product of the surface crosslinking reaction in the amount of 0.05 g and mixed.

Example 5

Superabsorbent polymer was prepared by the same method as Example 3, except that after the surface crosslinking reaction, the alumina compound (Aeroxide Alu 130, EVONIK Company) was added to the product of the surface crosslinking reaction in the amount of 0.08 g and mixed.

Example 6

Superabsorbent polymer was prepared by the same method as Example 3, except that when progressing the surface crosslinking reaction, 0.1 g of an alumina compound (Aeroxide Alu 130, EVONIK Company) was added to the surface crosslinking solution instead of the silica compound (Aerosil 380, EVONIK Company), and after the surface crosslinking reaction, the alumina compound (Aeroxide Alu 130, EVONIK Company) was added to the product of the surface crosslinking reaction in the amount of 0.1 g and mixed.

Comparative Examples 1 to 6: Preparation of Superabsorbent Polymer

Comparative Example 1

Superabsorbent polymer was prepared by the same method as Example 1, except that when progressing the surface crosslinking reaction, a silica compound (Aerosil 200, EVONIK Company) was not added to the surface crosslinking solution, and after the surface crosslinking reaction, an alumina compound (Aeroxide Alu 130, EVONIK Company) was not added to the product of the surface crosslinking reaction.

Comparative Example 2

Superabsorbent polymer was prepared by the same method as Example 1, except that after the surface crosslinking reaction, an alumina compound (Aeroxide Alu 130, EVONIK Company) was not added to the product of the surface crosslinking reaction.

Comparative Example 3

Superabsorbent polymer was prepared by the same method as Example 1, except that when progressing the surface crosslinking reaction, a silica compound (Aerosil 200, EVONIK Company) was not added to the surface crosslinking solution.

Comparative Example 4

Superabsorbent polymer was prepared by the same method as Example 3, except that when progressing the surface crosslinking reaction, a silica compound (Aerosil 380, EVONIK Company) was not added to the surface crosslinking solution, and after the surface crosslinking reaction, an alumina compound (Aeroxide Alu 130, EVONIK Company) was not additionally added to the product of the surface crosslinking reaction.

Comparative Example 5

Superabsorbent polymer was prepared by the same method as Example 3, except that after the surface crosslinking reaction, an alumina compound (Aeroxide Alu 130, EVONIK Company) was not additionally added to the product of the surface crosslinking reaction.

Comparative Example 6

Superabsorbent polymer was prepared by the same method as Example 3, except that when progressing the surface crosslinking reaction, a silica compound (Aerosil 380, EVONIK Company) was not added to the surface crosslinking solution.

Experimental Example: Measurement of Properties of the Superabsorbent Polymer Obtained in Examples and Comparative Examples For the superabsorbent polymer prepared in Examples and Comparative Examples, the properties were measured by the following methods, and the results are shown in Table 1 and Table 2.

Experimental Example 1. Absorbency Under Load (AUL)

(1) Absorbency under load (AUL) of 0.7 psi

Absorbency under load (AUL) of 0.7 psi of the superabsorbent polymer prepared in Examples 1 to 2 and Comparative Examples 1 to 3 for a saline solution was measured according to EDANA method WSP 242.2, and the results are described in the following Table 1.

Specifically, on the bottom of a plastic cylinder with an inner diameter of 25 mm, a 400 mesh screen made of stainless was installed. And, at room temperature and humidity of 50%, superabsorbent polymer $W_0$ (g, about 0.16 g) of which absorbency under load is to be measured was uniformly distributed on the screen. Subsequently, a piston capable of uniformly giving a load of 4.83 kPa (0.7 psi) on the superabsorbent polymer was added. Here, a piston which has an outer diameter slightly smaller than 25 mm and thus has no gap with the inner wall of the cylinder, and has been manufactured so as to freely move up and down, was used. And, the weight $W_1$ (g) of the prepared device was measured.

Subsequently, a glass filter with a diameter of 90 mm and a thickness of 5 mm was put inside a petri dish with a diameter of 150 mm, and a 0.9 wt % saline solution was poured into the petri dish. Here, the saline solution was poured until the surface of saline solution became horizontal to the surface of the glass filter. And, one piece of a filter paper with a diameter of 90 mm was placed on the glass filter.

Subsequently, the prepared device was put on the filter paper, allowing the superabsorbent polymer in the device swell by the saline solution under load. After 1 hour, the weight $W_2$ (g) of the device containing swollen superabsorbent polymer was measured.

Using the measured weights, absorbency under load was calculated according to the following Equation 2.

$$0.7 \text{ psi의 } AUL(g/g)=[W_2(g)-W_1(g)]/W_0(g) \qquad \text{[Equation 2]}$$

in the Equation 2, $W_0$ (g) is the initial weight of superabsorbent polymer (g), $W_1$ (g) is the sum of the weight of superabsorbent polymer and the weight of a device capable of giving a load to the superabsorbent polymer, $W_2$ (g) is the sum of the weight of superabsorbent polymer and the weight of a device capable of giving a load to the superabsorbent polymer, after absorbing a saline solution into the superabsorbent polymer under a load of 0.7 psi for 1 hour.

And, decrease rate of absorbency under load of 0.7 psi was calculated according to the following Equation 1.

$$\text{Decrease rate of absorbency under load of 0.7 psi } (\%)=\{(A1-A0)/A0\}*100 \qquad \text{[Equation 1]}$$

in the Equation 1,

A0 is the absorbency under load value of superabsorbent polymer that does not comprise first inorganic material and second inorganic material, calculated by the following Equation 2, and A1 is the absorbency under load value of superabsorbent polymer that comprises first inorganic material and second inorganic material, calculated by the following Equation 2. More specifically, A0 is absorbency under load value of the superabsorbent polymer obtained in Comparative Example 1, calculated by the above Equation 2, and A1 is absorbency under load value of the superabsorbent polymer obtained in Example 1 or 2, calculated by the above Equation 2.

(2) Absorbency Under Load of 0.9 psi (AUL)

Absorbency under load (AUL) of 0.9 psi of the superabsorbent polymer prepared in Examples 3 to 6 and Comparative Examples 4 to 6 for a saline solution was measured according to EDANA method WSP 242.2, and the results are described in the following Table 2.

Specifically, on the bottom of a plastic cylinder with an inner diameter of 25 mm, a 400 mesh screen made of stainless was installed. And, at room temperature and humidity of 50%, superabsorbent polymer $W_0$ (g, about 0.16 g) of which absorbency under load is to be measured was uniformly distributed on the screen. Subsequently, a piston capable of uniformly giving a load of 6.3 kPa (0.9 psi) on the superabsorbent polymer was added. Here, a piston which has an outer diameter slightly smaller than 25 mm and thus has no gap with the inner wall of the cylinder, and has been manufactured so as to freely move up and down, was used. And, the weight $W_3$ (g) of the prepared device was measured.

Subsequently, a glass filter with a diameter of 90 mm and a thickness of 5 mm was put inside a petri dish with a diameter of 150 mm, and a 0.9 wt % saline solution was poured into the petri dish. Here, the saline solution was poured until the surface of saline solution became horizontal to the surface of the glass filter. And, one piece of a filter paper with a diameter of 90 mm was placed on the glass filter.

Subsequently, the prepared device was put on the filter paper, allowing the superabsorbent polymer in the device swell by the saline solution under load. After 1 hour, the weight $W_4$ (g) of the device containing swollen superabsorbent polymer was measured.

Using the measured weights, absorbency under load was calculated according to the following Equation 4.

$$AUL(g/g) \text{ of } 0.9 \text{ psi}=[W_4(g)-W_3(g)]/W_0(g) \qquad \text{[Equation 4]}$$

in the Equation 4, $W_0$ (g) is the initial weight of superabsorbent polymer (g), $W_3$ (g) is the sum of the weight of superabsorbent polymer and the weight of a device capable of giving a load to the superabsorbent polymer, $W_4$ (g) is the sum of the weight of superabsorbent polymer and the weight of a device capable of giving a load to the superabsorbent polymer, after absorbing a saline solution into the superabsorbent polymer under a load of 0.9 psi for 1 hour.

And, decrease rate of absorbency under load of 0.9 psi was calculated according to the following Equation 3.

$$\text{Decrease rate of absorbency under load of 0.9 psi } (\%)=\{(A3-A2)/A2\}*100 \qquad \text{[Equation 3]}$$

In the Equation 3, A2 is the absorbency under load value of superabsorbent polymer that does not comprise first inorganic material and second inorganic material, calculated by the following Equation 4, and A3 is the absorbency under load value of superabsorbent polymer that comprises first inorganic material and second inorganic material, calculated by the following Equation 4. More specifically, A2 is absorbency under load value of the superabsorbent polymer obtained in Comparative Example 4, calculated by the Equation 4, and A3 is absorbency under load value of the superabsorbent polymer obtained in Examples 3 to 6, calculated by the Equation 4

Experimental Example 2. Absorption Speed (Vortex-Test)

In to a 100 ml beaker, 50 ml of a 0.9 wt % NaCl solution was introduced, and then, each 2.00 g of the superabsorbent polymer prepared in Example and Comparative Example were added while stirring at 600 rpm with a stirrer. And, a time until the vortex of liquid generated by the stirring disappeared and a smooth surface was formed, was measured, and the results are described in the following Table 1 and Table 2.

Experimental Example 3. A/C Efficiency (Anti-Caking Efficiency)

Each 2 g ($W_5$) of the superabsorbent polymer prepared in Examples 1 to 2 and Comparative Examples 1 to 3 were uniformly applied on a flask dish with a diameter of 9 cm, and then, maintained in a constant temperature and humidity chamber maintaining the level of temperature of 40° C. and humidity of 80% for 10 minutes, and cooled at room temperature for 5 minutes. Thereafter, the amount ($W_6$) of the superabsorbent polymer dropped when the flask dish was turn upside down on the filter paper was measured.

Using the measured weights, anti-caking efficiency was calculated according to the following Equation 5, and as the value is higher, the efficiency is more excellent.

Anti-caking efficiency (%)=[$W_6$(g)/$W_5$(g)]*100   [Equation 5]

Experimental Example 4. GBP (Gel Bed Permeability)

GBP of the superabsorbent polymer prepared in Examples 3 to 6 and Comparative Examples 4 to 6 for a saline solution was measured according to the method described in Korean Patent Application No. 2014-7018005 as follows.

Specifically, in order to measure free swell GBP, the device shown in FIG. 1 to FIG. 3 was used. First, a plunger (536) equipped with a weight (548) was placed in an empty sample container (530), and the height from the top of the weight (548) to the bottom of the sample container (530) was measured to the accuracy of 0.01 mm using an appropriate gauge. During the measurement, force applied by thickness gauge was controlled to less than about 0.74N.

Meanwhile, among the superabsorbent polymer of which GBP is to be measured, superabsorbent polymer that passed through US standard 30 mesh screen and remained on US standard 50 mesh was selected to obtain superabsorbent polymer with a particle diameter of 300 μm to 600 μm.

About 2.0 g of the sieved superabsorbent polymer was put in a sample container (530), and uniformly spread on the bottom of the sample container. Subsequently, the container that is filled with 2.0 g of the sample and does not contain a plunger (536) and weight (548) was soaked in a 0.9 wt % saline solution for about 60 minutes so that the sample was swollen under no pressure. Here, the sample container (530) was put on a mesh positioned in a liquid reservoir so that the sample container (530) was slightly higher than the bottom of the liquid reservoir, and a mesh which does not have an influence on the movement of the saline solution to the sample container (530) was used. During saturation, the height of the saline solution was controlled such that the surface in the sample container is determined not by the saline solution but by the swollen superabsorbent polymer.

At the end of this period, an assembly of a plunger (536) and a weight (548) was put on the saturated superabsorbent polymer (568) in the sample container (530), and then, the sample container (530), plunger (536), weight (548) and swollen superabsorbent polymer (568) were taken out of the solution. Thereafter, before measuring GBP, the sample container (530), plunger (536), weight (548) and swollen superabsorbent polymer (568) were left on a flat large-grid non-deformable plate with a uniform thickness for about 30 seconds. And, using the same thickness gauge as previously used, the height from the top of the weight (548) to the bottom of the sample container (530) was measured again. And, the measurement value of the height of the device wherein a plunger (536) equipped with a weight (548) was placed in an empty sample container (530) was subtracted from the measurement value of the height of the device including swollen superabsorbent polymer (568), thus obtaining the thickness or height "H" of the swollen superabsorbent polymer.

For GBP measurement, a 0.9% saline solution was flowed into the sample container (530) containing swollen superabsorbent polymer (568), a plunger (536) and a weight (548). The flow rate of the saline solution into the sample container (530) was adjusted so that the saline solution was overflowed to the top of the cylinder (534), thereby exhibiting a constant head pressure equivalent to the height of the sample container (530). And, using a balance (602) and a beaker (603), the amount of the solution passing through the swollen superabsorbent polymer (568) to time was measured by a gravimetric method. Once overflow began, data points were collected from the balance (602) every second for more than 60 seconds. The flow rate (Q) passing through the swollen superabsorbent polymer (568) was determined as g/sec by linear least-square fit of liquid (g) passing through the swollen superabsorbent polymer (568) to time (sec). Using the obtained data value, GBP ($cm^2$) was calculated according to the following Equation 6.

$K=[Q*H*\mu]/[A*\rho*P]$   [Equation 6]

In the Equation 6,
K is gel bed permeability ($cm^2$),
Q is flow rate (g/sec),
H is the height of swollen sample (cm),
μ is liquid viscosity (P)(the viscosity of the test solution used in this test is about 1 cP),
A is the cross sectional area for liquid flow (for the sample container used in this test, 28.27 $cm^2$),
ρ is liquid density (g/$cm^3$)(for the sample container used in this test, about 1 g/$cm^3$),
P is hydrostatic pressure (dyne/$cm^2$)(normally, about 7,797 dyne/$cm^2$).

The hydrostatic pressure is calculated from the Equation P=ρ*g*h, wherein p is liquid density (g/$cm^3$), g is gravitational acceleration (nominally, 981 cm/$sec^2$), and h is liquid height (for example, for the GBP test described herein, 7.95 cm).

Minimum 2 samples were tested, the results were averaged to determine free swell GBP of superabsorbent polymer, and the unit was converted into darcy (1 darcy=0.98692×$10^{-8}$ $cm^2$) and shown in the following Table 2.

Experimental Example 5. Centrifuge Retention Capacity (CRC) for a Saline Solution According to European Disposables and Nonwovens Association, EDANA standard EDANA WSP 241.2, for the superabsorbent polymer of Examples and Comparative Examples, centrifuge retention capacity (CRC) by the absorption scale under no load was measured, and the results are described in the following Table 1 and Table 2.

That is, $W_0$ (g, about 0.2 g) of the polymer of Examples and Comparative Examples were uniformly put in an envelope made of non-woven fabric and sealed, and then, immersed in a saline solution of 0.9 wt % sodium chloride aqueous solution at room temperature. After 30 minutes, the envelope was drained at 250 G for 3 minutes using a centrifuge, and then, the mass $W_8$ (g) of the envelope was measured. And, after the same operation without using polymer, the mass $W_7$ (g) at that time was measured.

Using the obtained mass, CRC (g/g) was calculated according to the following Equation 7, thus confirming centrifuge retention capacity.

CRC(g/g)={[$W_8$(g)−$W_7$(g)]/$W_0$(g)}−1   [Equation 7]

In the Equation 7,
$W_0$ (g) is the initial weight of superabsorbent polymer (g),
$W_7$ (g) is the weight of a tea bag, measured after dehydration using a centrifuge at 250 G for 3 minutes, without using superabsorbent polymer.
$W_8$ (g) is the weight of a tea bag including superabsorbent polymer, measured after superabsorbent polymer is immersed in a 0.9 wt % saline solution for 30 minutes to absorb, and then, dehydrated using a centrifuge at 250 G for 3 minutes.

TABLE 1

| | Wet additive | Wet added amount (g) | Dry additive | Dry amount (g) | CRC (g/g) | Absorption speed (sec) | 0.7 psi AUL (g/g) | Absorbency under load decrease rate (%) | A/C Efficiency (%) |
|---|---|---|---|---|---|---|---|---|---|
| Comparative Example 1 | Aerosil 200 | 0 | Aeroxide Alu 130 | 0 | 33.9 | 34 | 17.8 | — | 0 |
| Comparative Example 2 | | 0.01 | | 0 | 33.8 | 33 | 17.6 | −1.1 | — |
| Comparative Example 3 | | 0 | | 0.09 | 34.6 | 31 | 15.5 | −12.9 | 84 |
| Example 1 | | 0.01 | | 0.09 | 34.7 | 30 | 15.5 | −12.9 | 95 |
| Example 2 | | | | 0.13 | 34.6 | 30 | 15.2 | −14.6 | 100 |

*wet adding: adding inorganic material to the surface crosslinking solution
*dry adding: adding inorganic material to the product of the surface crosslinking reaction The results of Experimental Examples of the superabsorbent polymer obtained in Examples 1 to 2, Comparative Examples 1 to 3

As shown in Table 1, it was confirmed that in the case of the superabsorbent polymer obtained in Examples 1 to 2, by adding a silica compound (Aerosil 200) under wet condition and an alumina compound (Aeroxide Alu 130) under dry condition, centrifuge retention capacity was improved and absorption speed became fast, compared to the superabsorbent polymer obtained in Comparative Example 1 wherein neither alumina nor silica compound was added under wet and dry conditions, and the superabsorbent polymer obtained in Comparative Example 2 wherein an alumina or silica compound was added only under dry condition.

And, the superabsorbent polymer obtained in Examples 1 to 2 exhibited 0.7 psi absorbency under load of 15.5 g/g and 15.2 g/g, respectively, and thus, the differences from 17.8 g/g of Comparative Example 1 were measured to be 2.3 g/g and 2.6 g/g, respectively. That is, it was confirmed that the superabsorbent polymer obtained in Examples 1 to 2 has small decrease in 0.7 psi absorbency under load of less than 5 g/g, based on the superabsorbent polymer obtained in Comparative Example 1.

Meanwhile, it was confirmed that in the case of the superabsorbent polymer obtained in Comparative Example 3 wherein an alumina or silica compound was added only under wet condition, although absorbency under load decrease rate was exhibited at an equivalent level, the anti-caking efficiency decreased compared to Examples.

Thus, it was confirmed that in the case of the superabsorbent polymer obtained in Examples, by adding an alumina or silica compound to the surface crosslinking solution and after surface crosslinking, decrease in absorbency under load can be minimized while remarkably improving agglomeration.

The results of Experimental Examples of the superabsorbent polymer obtained in Examples 3 to 6, Comparative Examples 4 to 6

TABLE 2

| | Wet additive | Wet added amount (g) | Dry additive | Dry added amount (g) | CRC (g/g) | 0.9 psi AUL (g/g) | Absorbency under load decrease rate (%) | GBP (darcy) | Absorption speed (sec) |
|---|---|---|---|---|---|---|---|---|---|
| Comparative Example 4 | Aerosil 380 | 0 | Aeroxide Alu 130 | 0 | 30.5 | 21.5 | — | 24 | 49 |
| Comparative Example 5 | | 0.1 | | 0 | 30.8 | 21.1 | −1.9 | 37 | 48 |
| Comparative Example 6 | | 0 | | 0.03 | 30.4 | 21.2 | −1.4 | 35 | 44 |
| Example 3 | | 0.1 | | 0.03 | 30.4 | 20.9 | −2.8 | 46 | 41 |
| Example 4 | | 0.1 | | 0.05 | 30.7 | 20.0 | −7.0 | 56 | 40 |
| Example 5 | | 0.1 | | 0.08 | 30.3 | 19.6 | −8.8 | 72 | 39 |
| Example 6 | | 0.1 | Aeroxide Alu 130 | 0.1 | 30.8 | 19.3 | −10.2 | 74 | 40 |

*wet adding: adding inorganic material to the surface crosslinking solution
*dry adding: adding inorganic material to the product of the surface crosslinking reaction As shown in Table 2, it was confirmed that in the case of the superabsorbent polymer obtained in Examples 3 to 6, by adding a silica compound (Aerosil 200) or an alumina compound (Aeroxide Alu 139) under wet condition, and an alumina compound (Aeroxide Alu 139) under dry condition, an absorption speed became fast to less than 43 seconds, and gel bed permeability increased to 40 darcy or more, thus exhibiting excellent properties, compared to the superabsorbent polymer obtained in Comparative Example 4 wherein neither alumina nor silica compound was added under wet and dry conditions, and the superabsorbent polymer obtained in Comparative Example 5 wherein an alumina or silica compound was added only under wet condition, and the superabsorbent polymer obtained in Comparative Example 6 wherein an alumina or silica compound was added only under dry condition.

And, the superabsorbent polymer obtained in Examples 3 to 6 wherein an alumina compound was additionally added under dry condition after surface crosslinking reaction, exhibited 0.9 psi absorbency under load of 20.9 g/g, 20.0 g/g, 19.6 g/g, 19.3 g/g, respectively, and thus, the differences from 21.5 g/g of Comparative Example 4 were measured to be 0.6 g/g, 1.5 g/g, 1.9 g/g, 2.2 g/g, respectively. That is, it was confirmed that the superabsorbent polymer obtained in Examples 3 to 6 had small decrease in 0.9 psi absorbency under load of less than 5 g/g, based on the superabsorbent polymer obtained in Comparative Example 4.

Thus, it was confirmed that in the case of the superabsorbent polymer obtained in Examples, by adding alumina or silica compounds to the surface crosslinking solution and after surface crosslinking, decrease in absorbency under load can be minimized while maintaining permeability.

The invention claimed is:

1. A method for preparing superabsorbent polymer comprising the steps of:
   (a) polymerizing a monomer mixture in the presence of an internal crosslinking agent to form a hydrogel polymer, wherein the monomer mixture comprises a water soluble ethylenically unsaturated monomer having an acid group of which at least a part is neutralized;
   (b) drying, grinding and sieving the hydrogel polymer to form a base resin powder;
   (c) surface crosslinking the base resin powder in the presence of a surface crosslinking solution to form a surface crosslinked layer on the base resin powder, wherein the surface crosslinking solution comprises a first inorganic material; and
   (d) adding a second inorganic material on a surface of the surface crosslinked layer to form a superabsorbent polymer,
   wherein the second inorganic material comprises alumina having a BET specific surface area of 50 m$^2$/g to 200 m$^2$/g,
   wherein the second inorganic material is present between 0.01 parts by weight to 0.2 parts by weight, based on 100 parts by weight of the base resin powder,
   wherein the second inorganic material is present between 10 parts by weight to 200 parts by weight, based on 100 parts by weight of the first inorganic material,
   wherein the first inorganic material is different from the second inorganic material, and
   wherein the superabsorbent polymer has absorbency under a load decrease rate of −15% to −2.8%, as measured at 0.9 psi according to the following Equation 3:

Decrease rate of absorbency under load of 0.9 psi (%)={(A3−A2)/A2}*100  [Equation 3]

in the Equation 3,
   A2 is absorbency under a load value of superabsorbent polymer that does not comprise the first inorganic material and the second inorganic material, calculated by the following Equation 4,
   A3 is absorbency under a load value of superabsorbent polymer that comprises the first inorganic material and the second inorganic material, calculated by the following Equation 4, AUL(g/g) of 0.9 psi=[$W_4$(g)−$W_3$(g)]/$W_0$(g)  [Equation 4]

in the Equation 4,
   $W_0$(g) is an initial weight of superabsorbent polymer (g), $W_3$(g) is a sum of a weight of the superabsorbent polymer and a weight of a device capable of giving a load to the superabsorbent polymer, $W_4$(g) is a sum of a weight of the superabsorbent polymer and a weight of the device capable of giving a load to the superabsorbent polymer, after absorbing a saline solution into the superabsorbent polymer under a load of 0.9 psi for 1 hour.

2. The method for preparing the superabsorbent polymer according to claim 1, wherein the first inorganic material included in the surface crosslinked layer contacts the surface of the base resin powder.

3. The method for preparing the superabsorbent polymer according to claim 1, wherein in step (c) a content of the first inorganic material is 0.001 parts by weight to 1 part by weight, based on 100 parts by weight of the base resin powder.

4. The method for preparing the superabsorbent polymer according to claim 1, wherein in step (d) a content of the second inorganic material is 0.001 parts by weight to 1 part by weight, based on 100 parts by weight of the base resin powder.

5. The method for preparing the superabsorbent polymer according to claim 1, wherein the first inorganic material comprises one or more selected from the group consisting of silica, clay, alumina, silica-alumina composite, titania, zinc oxide, and aluminum sulfate.

6. The method for preparing the superabsorbent polymer according to claim 1, wherein a particle diameter of alumina is 1 nm to 100 nm.

7. The method for preparing the superabsorbent polymer according to claim 5, wherein the alumina has a BET specific surface area of 50 m$^2$/g to 200 m$^2$/g.

8. The method for preparing the superabsorbent polymer according to claim 1, wherein a surface of silica or a surface of alumina is positively charged.

9. The method for preparing the superabsorbent polymer according to claim 1, wherein the surface crosslinking agent includes one or more polyols selected from the group consisting of ethyleneglycol, propyleneglycol, 1,4-butandiol, 1,6-hexandiol, 1,2-hexandiol, 1,3-hexandiol, 2-methyl-1,3-propandiol, 2,5-hexandiol, 2-methyl-1,3-pentandiol, 2-methyl-2,4-pentandiol, tripropyleneglycol and glycerol; or one or more carbonate-based compounds selected from the group consisting of ethylene carbonate and propylene carbonate.

10. The method for preparing the superabsorbent polymer according to claim 1, wherein the surface crosslinking solution further comprises one or more kinds of solvents selected from the group consisting of water, ethanol, ethyleneglycol, diethyleneglycol, triethyleneglycol, 1,4-butandiol, propyleneglycol, ethyleneglycol monobutylether, propyleneglycol monomethylether, propyleneglycol monomethyl ether acetate, methyl ethyl ketone, acetone, methyl amyl ketone, cyclohexanone, cyclopentanone, diethyleneglycol monomethyl ether, diethyleneglycol ethyl ether, toluene, xylene, butyrolactone, carbitol, methyl cellosolve acetate and N,N-dimethylacetamide.

11. The method for preparing the superabsorbent polymer according to claim 1, further comprising:
    (e) crushing the superabsorbent polymer.

12. A method for preparing superabsorbent polymer comprising the steps of:
    (a) polymerizing a monomer mixture in the presence of an internal crosslinking agent to form a hydrogel polymer, wherein the monomer mixture comprises a water soluble ethylenically unsaturated monomer having an acid group of which at least a part is neutralized;
    (b) drying, grinding and sieving the hydrogel polymer to form a base resin powder;
    (c) surface crosslinking the base resin powder in the presence of a surface crosslinking solution to form a surface crosslinked layer on the base resin powder, wherein the surface crosslinking solution comprises a first inorganic material; and (d) adding a second inorganic material on a surface of the surface crosslinked layer to form a superabsorbent polymer, wherein the second inorganic material comprises alumina having a BET specific surface area of 50 m$^2$/g to 200 m$^2$/g, wherein the second inorganic material is present between 0.01 parts by weight to 0.2 parts by weight, based on 100 parts by weight of the base resin powder, wherein the second inorganic material is present between 700 parts by weight to 1500 parts by weight, based on 100 parts by weight of the first inorganic material, wherein the first inorganic material is different from the second inorganic material, and wherein an anti-caking efficiency of the superabsorbent polymer according to the following Equation 5 is 95% to 100%, Anti-caking efficiency (%)=[$W_6$(g)/$W_5$(g)]*100    [Equation 5]

in the Equation 5,
$W_5$(g) is an initial weight of the superabsorbent polymer(g), and $W_6$(g) is an amount(g) of the superabsorbent polymer dropped when the superabsorbent polymer is applied on a flask dish of 9 cm diameter, maintained in a constant temperature and humidity chamber of temperature of 40±3° C. and humidity of 80±3% for 10 minutes, and cooled at room temperature for 5 minutes, and then, the flask dish is turned upside down on a filter paper.

* * * * *